(12) United States Patent
Niimi et al.

(10) Patent No.: US 10,950,143 B2
(45) Date of Patent: Mar. 16, 2021

(54) HYDROGEL STRUCTURE, BLOOD VESSEL, INTERNAL ORGAN MODEL, PRACTICE TOOL FOR MEDICAL PROCEDURE, AND METHOD OF MANUFACTURING THE HYDROGEL STRUCTURE

(71) Applicants: Tatsuya Niimi, Kanagawa (JP); Yoshihiro Norikane, Kanagawa (JP); Takashi Matsumura, Kanagawa (JP); Hiroshi Iwata, Aichi (JP); Noriaki Okada, Kanagawa (JP); Takuya Saito, Kanagawa (JP)

(72) Inventors: Tatsuya Niimi, Kanagawa (JP); Yoshihiro Norikane, Kanagawa (JP); Takashi Matsumura, Kanagawa (JP); Hiroshi Iwata, Aichi (JP); Noriaki Okada, Kanagawa (JP); Takuya Saito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 467 days.

(21) Appl. No.: 15/692,833

(22) Filed: Aug. 31, 2017

(65) Prior Publication Data

US 2018/0061279 A1    Mar. 1, 2018

(30) Foreign Application Priority Data

Aug. 31, 2016  (JP) .............................. JP2016-169950
Aug. 31, 2016  (JP) .............................. JP2016-169963

(Continued)

(51) Int. Cl.
*G09B 23/30*  (2006.01)
*B33Y 70/00*  (2020.01)
(Continued)

(52) U.S. Cl.
CPC .............. *G09B 23/30* (2013.01); *B33Y 70/00* (2014.12); *B33Y 80/00* (2014.12); *C08J 3/075* (2013.01);
(Continued)

(58) Field of Classification Search
CPC ................................ G09B 23/28; G09B 23/30
(Continued)

(56) References Cited

U.S. PATENT DOCUMENTS 4,106,219 A * 8/1978 Schneider .............. A61B 17/58
                                                         434/274
4,312,826 A * 1/1982 Colvin ................ B29C 33/3857
                                                         264/221

(Continued)

FOREIGN PATENT DOCUMENTS

EP   0 271 216 A2   6/1988
EP   1 887 543 A1   2/2008
(Continued)

OTHER PUBLICATIONS

Extended Search Report dated Oct. 13, 2017 in European patent Application No. 17188431.5.
(Continued)

*Primary Examiner* — Kurt Fernstrom
(74) *Attorney, Agent, or Firm* — Oblon, McClelland, Maier & Neustadt, L.L.P.

(57) ABSTRACT

A hydrogel structure includes a hollow tubular structure having an inner diameter of 1.0 mm or less, wherein the hydrogel structure has a transmission of 80 percent or more in a visible light range.

19 Claims, 4 Drawing Sheets

(30) Foreign Application Priority Data

| Aug. 31, 2016 | (JP) | JP2016-169979 |
|---|---|---|
| Aug. 31, 2016 | (JP) | JP2016-169989 |
| May 9, 2017 | (JP) | JP2017-092812 |
| Jul. 28, 2017 | (JP) | JP2017-146760 |

(51) Int. Cl.
- *B33Y 80/00* (2015.01)
- *C08J 3/075* (2006.01)
- *G09B 23/28* (2006.01)
- *B33Y 10/00* (2015.01)
- *B29C 64/40* (2017.01)
- *B29K 105/00* (2006.01)
- *B29L 31/00* (2006.01)

(52) U.S. Cl.
CPC ............ *G09B 23/285* (2013.01); *B29C 64/40* (2017.08); *B29K 2105/0002* (2013.01); *B29K 2105/0061* (2013.01); *B29L 2031/7532* (2013.01); *B33Y 10/00* (2014.12)

(58) Field of Classification Search
USPC .................................. 434/262, 267, 268, 272
See application file for complete search history.

(56) References Cited

U.S. PATENT DOCUMENTS

| | | | |
|---|---|---|---|
| 4,878,907 A | 11/1989 | Okada et al. | |
| 4,920,158 A * | 4/1990 | Murray | A61L 26/0052 523/111 |
| 4,941,870 A | 7/1990 | Okada et al. | |
| 5,962,005 A * | 10/1999 | Saga | A61F 2/14 106/162.6 |
| 6,192,329 B1 * | 2/2001 | Rider | B44C 3/042 703/6 |
| 7,037,111 B2 * | 5/2006 | Miller | A61C 7/00 433/213 |
| 7,993,140 B2 * | 8/2011 | Sakezles | G09B 23/306 434/267 |
| 2003/0105221 A1 * | 6/2003 | Christenson | A61L 9/012 524/589 |
| 2007/0166670 A1 * | 7/2007 | Sakezles | G09B 23/28 434/86 |
| 2008/0050710 A1 * | 2/2008 | Cottler | G09B 23/28 434/270 |
| 2008/0076101 A1 * | 3/2008 | Hyde | G09B 23/30 434/272 |
| 2008/0317818 A1 * | 12/2008 | Griffith | A61K 9/0051 424/427 |
| 2009/0015818 A1 | 1/2009 | Saichhkeda et al. | |
| 2010/0041005 A1 * | 2/2010 | Campbell | G09B 23/28 434/267 |
| 2010/0330545 A1 * | 12/2010 | Tian | A61B 17/00 434/267 |
| 2012/0077169 A1 * | 3/2012 | Takeda | G09B 23/288 434/267 |
| 2013/0059280 A1 * | 3/2013 | Haverich | C12N 5/00 434/272 |
| 2013/0102690 A1 | 4/2013 | Battersby et al. | |
| 2014/0142200 A1 * | 5/2014 | Duan | A61L 27/24 514/773 |
| 2014/0248596 A1 * | 9/2014 | Hart | G09B 23/30 434/272 |
| 2014/0302474 A1 * | 10/2014 | Sakezles | G09B 23/303 434/268 |
| 2015/0170547 A1 | 6/2015 | Battersby et al. | |
| 2016/0115297 A1 | 4/2016 | Norikane et al. | |
| 2016/0193384 A1 * | 7/2016 | Phopase | A61L 27/34 424/93.7 |
| 2017/0008228 A1 | 1/2017 | Iwata et al. | |
| 2017/0022348 A1 | 1/2017 | Iwata et al. | |
| 2017/0239886 A1 | 8/2017 | Norikane | |
| 2019/0150379 A1 * | 5/2019 | Cademartiri | C08B 37/006 |

FOREIGN PATENT DOCUMENTS

| | | |
|---|---|---|
| JP | 63-119755 | 5/1988 |
| JP | 2-503057 | 9/1990 |
| JP | 5-237141 | 9/1993 |
| JP | 2008-70847 A | 3/2008 |
| JP | 2009-144836 | 7/2009 |
| JP | 2009-273508 | 11/2009 |
| JP | 2011-076035 | 4/2011 |
| JP | 2012-189909 | 10/2012 |
| JP | 2014-106400 | 6/2014 |
| JP | 2015-069054 | 4/2015 |
| JP | 2015-136895 | 7/2015 |
| JP | 2015-138192 | 7/2015 |
| JP | 2015-219371 | 12/2015 |
| JP | 2016-038563 | 3/2016 |
| JP | 2016-057451 | 4/2016 |
| JP | 2016-078437 | 5/2016 |
| WO | WO89/007133 A2 | 8/1989 |

OTHER PUBLICATIONS

Office Action dated Jun. 6, 2019 in European Patent Application No. 17 188 431.5, 5 pages.

U.S. Appl. No. 15/450,720, filed Mar. 6, 2017, Yoshihiro Norikane, et al.

Office Action in corresponding Japanese Patent Application No. 2016-169950, dated Sep. 1, 2020.

\* cited by examiner

HYDROGEL STRUCTURE, BLOOD VESSEL, INTERNAL ORGAN MODEL, PRACTICE TOOL FOR MEDICAL PROCEDURE, AND METHOD OF MANUFACTURING THE HYDROGEL STRUCTURE

CROSS-REFERENCE TO RELATED APPLICATIONS

This patent application is based on and claims priority pursuant to 35 U.S.C. § 119 to Japanese Patent Application Nos. 2016-169979, 2016-169989, 2016-169963, 2016-169950, 2017-092812, and 2017-146760, filed on Aug. 31, 2016, Aug. 31, 2016, Aug. 31, 2016, Aug. 31, 2016, May 9, 2017, and Jul. 28, 2017, respectively, in the Japan Patent Office, the entire disclosures of which are hereby incorporated by reference herein.

BACKGROUND

Technical Field

The present disclosure relates to a hydrogel structure, a blood vessel, an internal organ model, a practice tool for medical procedure, and a method of manufacturing the hydrogel structure.

Description of the Related Art

Vascular surgery includes treatment of swollen parts (aneurysm) and shunt, cutoff, anastomosis, etc. of blood vessels.

In such vascular surgery, catheter serving as an instrument having a wire-like form is intubated into a blood vessel in many cases. Such insertion of catheter requires training for medical procedures (surgical technique). Animals or blood vessel models are used in the training if a human body is not used.

If an animal is used, since the blood vessels are present inside the animal body, diseased parts are irradiated with X-rays to render it visible for catheter insertion. Therefore, if the training for medical procedure is repeated, the trainee is excessively exposed to X-rays.

A catheter curing simulator, which is formed of transparent material, has been proposed.

In addition, mock blood vessel of the blood vessel of a patient, mock vascular involvement having parts formed of a plurality of small lesion parts different in hardness, and a method of manufacturing a blood vessel model for use in simulation before surgery have been proposed.

Moreover, internal organ models manufactured using silicone, a urethane elastomer, a styrene elastomer, etc. have been used for practices of medical procedures such as surgical operations. Surgeons and support staff members are required to have medical procedure levels above certain levels to improve postoperative recovery and quality of life (QOL) of a patient. For this reason, internal organ models are required having textures, internal structures, and sense of use of surgical devices such as an ultrasonic knife and an electrosurgical knife closer to those of real human internal organs.

In addition, if an internal organ model formed of hydrogel having blood vessels is used, no or little artificial blood oozes when the blood vessel is dissected. For this reason, realistic sensation of surgery is lost. Therefore, to impart the real sensation in the training for medical procedure, the internal organ model is demanded to bleed when a blood vessel therein is cut.

As the internal organ model to represent textures of human internal organs, materials to mold an internal organ model mainly including polyvinyl alcohol have been proposed.

In addition, internal organ models have been proposed which use a material liquidized due to heat of a heat generating device such as an electrosurgical knife. When it is cut open by the heat generating device, artificial blood is liquefied due to the heat of the heat generating device and eluted out.

SUMMARY

According to an embodiment of the present disclosure, provided is an improved hydrogel structure including a hollow tubular structure having an inner diameter of 1.0 mm or less, wherein the hydrogel structure has a transmission of 80 percent or more in a visible light range.

BRIEF DESCRIPTION OF THE SEVERAL VIEWS OF THE DRAWINGS

Various other objects, features and attendant advantages of the present disclosure will be more fully appreciated as the same becomes better understood from the detailed description when considered in connection with the accompanying drawings in which like reference characters designate like corresponding parts throughout and wherein.

DESCRIPTION OF THE EMBODIMENTS

Figure 1:
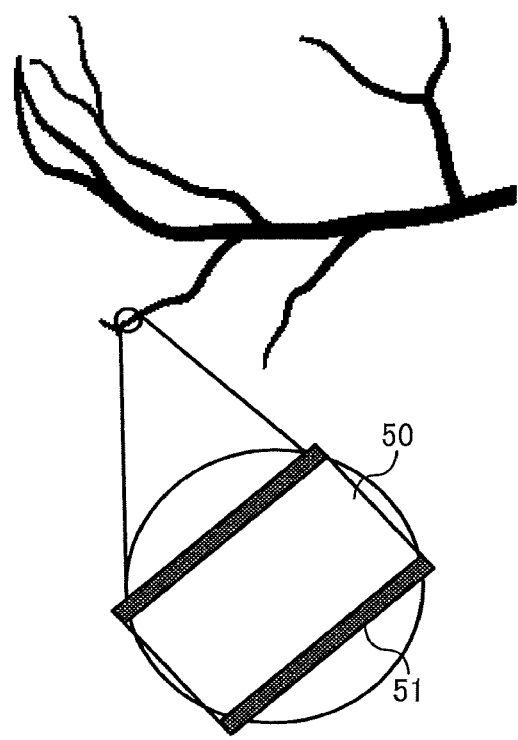
FIG. 1 is a schematic diagram illustrating an example of the blood vessel model (hydrogel structure) according to an embodiment of the present disclosure.

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Hydrogel Structure, Blood Vessel Model, and Internal Organ Model

The hydrogel structure of the present disclosure includes a hollow tubular structure having an inner diameter of 1.0 mm or less. In addition, the hydrogel structure has a transmission of 80 percent or more in the visible light range. It is preferable that the hydrogel structure furthermore include a mineral and a polymer and be formed of a hydrogel enclosing water in a three-dimensional network structure formed of a complex of the mineral and the polymer. The hydrogel represents a gel including water as the main component.

The hydrogel structure of the present disclosure is made based on the knowledge that typical catheter curing simulator is not applicable to 3D printing reproducing complicated forms or forms true to personal data of a patient because the method of manufacturing the simulator is limited due to a narrow selection range of material used. Moreover, the blood vessel model to be manufactured is disposable only on two dimensional plane so that actual 3D object structures cannot be reproduced. For this reason, it is not applicable to simulations before surgery to cure a diseased part having a 3D structure.

Moreover, the hydrogel structure of the present disclosure is manufactured based on the knowledge that a conventional blood vessel model manufactured by solid freeform fabrication using a flexible material such as silicone rubber is opaque and has textures different from that of real blood vessel.

Furthermore, the hydrogel structure of the present is made based on the knowledge that a conventional blood vessel lesion model requires a plurality of materials to constitute a plurality of small lesion parts different in hardness. In addition, it is also made based on the knowledge that a conventional model is fabricated based on a mold so that it is difficult to fabricate the model according to the personal data of a patient and reproduce a detailed structure.

Moreover, the hydrogel structure of the present disclosure is manufactured based on the knowledge that according to the method of manufacturing a conventional blood vessel model, it is possible to form a complicated form in some degree, however, the transmission of the blood vessel is not high and the texture thereof is not the texture of the real blood vessel.

In addition, the hydrogel structure of the present disclosure is manufactured based on the knowledge that a conventional internal organ model has textures, internal structures, and sense of use different from those of humane internal organs.

The blood vessel model of the present disclosure is constituted of the hydrogel structure according to an embodiment of the present disclosure.

The internal organ model of the present disclosure is constituted of the hydrogel structure according to an embodiment of the present disclosure and has an exterior of an internal organ-like form.

The hydrogel structure, the blood vessel model, and the internal organ model of the present disclosure can be suitably applied to training for medical procedure of catheter intubation or a simulation before surgery.

The hydrogel structure has no particular limit as long as it includes a hollow tubular structure having an inner diameter of 1.0 mm or less. It is preferable that the hydrogel structure itself is a hollow tubular structure with an inner diameter of 1.0 mm or less. For example, in the case of a blood vessel model, if the model takes a tree-like form hollow tubular structure in which blood vessels having an inner diameter of 1.0 mm or less and blood vessels having an inner diameter of not less than 1.0 mm are continuously connected and diverged, it is possible to reproduce a blood vessel network closer to that of an actual human being.

The hydrogel structure of the present disclosure includes a hollow tubular structure having an inner diameter of 1.0 mm or less. The inner diameter is preferably 0.5 mm or less and more preferably 0.3 mm or less. The inner diameter can be mechanically measured by an instrument such as caliper. Also, it can be measured by utilizing a microscope, etc. or a one-shot 3D form measuring device (for example, device available from KEYENCE CORPORATION).

In addition, an article such as a catheter having a known outer diameter is inserted into the hollow tubular structure to measure the inner diameter.

The hydrogel structure of the present disclosure may have a hollow tube having a thin end, a middle portion thinner than the other part, or an end having a thinner orifice than the other end. In addition, it can have a branch-like form or a tree-like form. The blood vessel form as illustrated in FIG. 1 is preferable.

The structure can be communicated or may have an occluded portion in a part of the tube such as a distal end. Also, the hollow tube can be double tube and may be laminated.

The internal tubular structure may employ a form of, for example, blood vessel, lymph channel, gullet, nasal cavity, acoustic duct, pharynges, throat cavity, buccal cavity, throat, bronchus, bronchiolus, stomach, small intestine (for example, intestine duodenum, intestinum jejunum, and intestinum ileum), large intestine (for example, intestinal cecum, colon, intestinum rectum, and canalis analis), pancreas duct, cystic duct, urethral tube, and bile duct) and can be used for a simulation for each surgery and a practice for medical procedures.

The hydrogel structure having the blood vessel structure can be suitably used as a blood vessel model.

The blood vessel model has no specific limit and can be suitably selected to suit to a particular application. For example, articles reproducing artery, vena, and capillary vessel are usable.

FIG. 1 is a schematic diagram illustrating an example of the blood vessel model (hydrogel structure) according to an embodiment of the present disclosure. As illustrated in FIG. 1, the blood vessel model include a blood vessel wall part 51 and a blood vessel hollow part 50. The thickness of the blood vessel wall is adjusted to change the texture of a blood vessel when a catheter is inserted. For example, if the thickness of the blood vessel film is thickened, for example, the texture of blood vessels, etc., hardened due to a disease, etc. can be reproduced.

Inlet and outlet of liquid (mock blood) can be provided to the hydrogel structure and a liquid circulator can be mounted thereon to cause the liquid to flow in the blood vessel model.

Figure 2A:
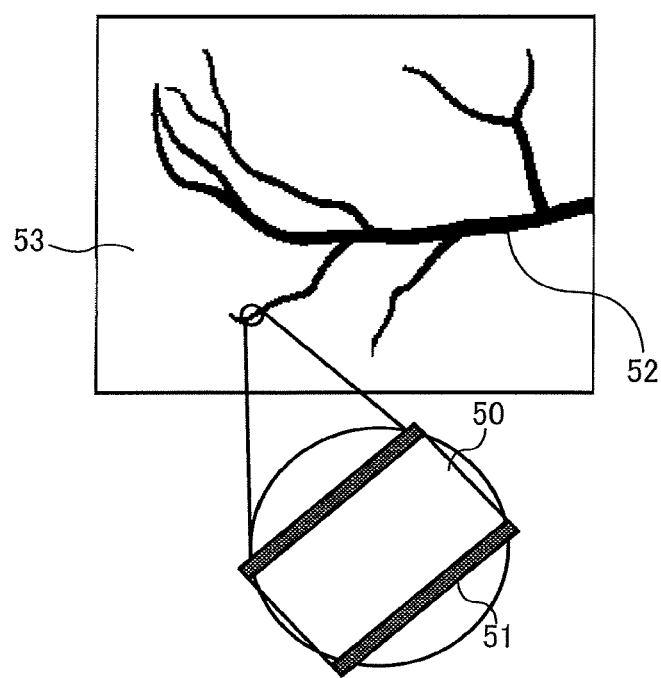
FIG. 2A is a schematic diagram illustrating an example of the blood vessel model (hydrogel structure) according to an embodiment of the present disclosure.

FIG. 2A is a schematic diagram illustrating an example of the hydrogel structure according to an embodiment of the present disclosure. As illustrated in FIG. 2A, a blood vessel model 52 including the blood vessel hollow part 50 and the blood vessel wall part 51 formed of hydrogel is covered with another structure 53 to improve handling property and storage stability. The another structure 53 can be hydrogel. If that is the case, the another structure 53 may also serve as the blood vessel wall part 51 (i.e., hydrogel structure including the another structure 53 of hydrogel enclosing the blood vessel hollow part 50).

Figure 2B:
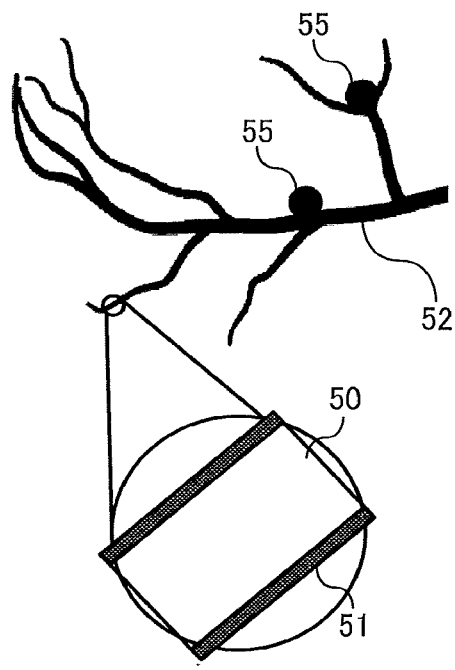
FIG. 2B is a schematic diagram illustrating another example of the blood vessel model (hydrogel structure) according to an embodiment of the present disclosure.

FIG. 2B is a schematic diagram illustrating another example of the hydrogel structure according to an embodiment of the present disclosure. As illustrated in FIG. 2B, in the blood vessel model including the blood vessel hollow part 50 and the blood vessel wall part 51 formed of a first hydrogel object, a portion such as a swollen part 55 having a low modulus of elasticity in comparison with a normal blood vessel can be reproduced by a second hydrogel object having a modulus of elasticity different from that of the first hydrogel object to reproduce a blood vessel lesion model.

In addition, a blood vessel model having a blood vessel wall part formed of at least the first hydrogel object and the second hydrogel object can be manufactured to reproduce the texture of the blood vessel hardened due to a disease.

In addition, the another structure 53 may have an exterior having an internal organ-like form, which can be suitably used as an internal organ model.

Figure 7:
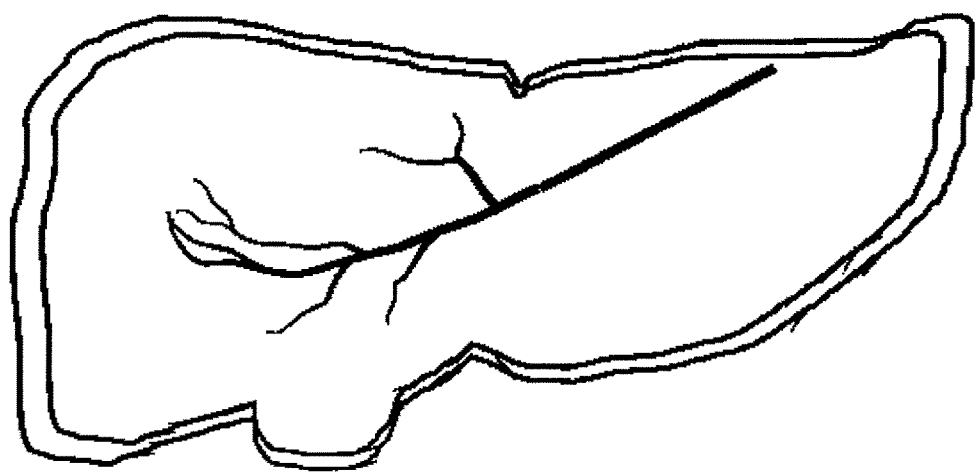
FIG. 7 is a schematic diagram illustrating an example of the internal organ model having an exterior of an internal organ (liver)-like form according to an embodiment of the hydrogel structure of the present disclosure.

The internal organ model has no particular limit and can be suitably selected to suit to a particular application. It can reproduce every internal organ portion in a human body, including brain, heart, gullet, bladder, liver as illustrated in FIG. 7, kidney, spleen, pancreas, cholecyst, and womb.

The transmission of the hydrogel structure is 80 percent or more in the visible light range, more preferably 85 percent or more, furthermore preferably 90 percent or more, and particularly preferably 95 percent or more. When the transmission is 80 percent or more, it is possible to render the inside of the hydrogel structure visible. The transmission can be measured by using, for example, a spectrophotometer (UV-3100, used under integration unit, manufactured by Shimadzu Corporation). The visible light range represents a wavelength range of from 400 to 700 nm.

In the method of measuring transmission, the hydrogel structure is cut in the longitudinal direction to form a sample having a plate-like form. To prevent diffuse reflection ascribable to roughness of the surface of the sample, an integration sphere unit is used. Also, optical fiber, etc. can be used to measure the detail. The plate-like form has a flat portion irradiated with light and may have a warped portion and plane-like portion.

The arithmetic mean surface roughness of at least a part of the inner wall of the hollow tubular structure of the hydrogel structure has no particular limit. For example, it is preferably 50 μm or less in terms of visibility from outside and reproducibility of inner wall of blood vessel, etc. In addition, it is possible to reproduce smoothness of catheter when the catheter is inserted into a blood vessel. In addition, it is possible to reproduce the inner wall of an internal organ such as intestinum crassum. Also, it is possible to adjust the arithmetic mean surface roughness in order not that an endoscope does not get stuck in the inner wall of an internal organ when the endoscope is inserted into the internal organ. The arithmetic mean surface roughness is preferably 40 μm or less, more preferably 30 μm or less, and particularly preferably 20 μm or less. The lower limit of the arithmetic mean surface roughness has no particular limit. For example, it is preferably 0.1 μm or greater in terms of reproducibility of blood vessel and the texture of the inner wall of an internal organ.

The arithmetic mean surface roughness means a surface roughness in an area of 500 μm square. The arithmetic mean surface roughness can be measured by, for example, using a laser microscope (VK-X100, manufactured by KEYENCE CORPORATION). The arithmetic mean surface roughness is preferably uniform over the entire of the inner wall of a hollow tube.

The coefficient of static friction of at least a part of the inner wall of the hollow tubular structure of the hydrogel structure is preferably 0.1 or less and more preferably 0.05 or less. When the coefficient of static friction is 0.1 or less, it is possible to manufacture a hydrogel structure having a texture close to that of a live body and a sense of use of a medical instrument such as catheter close to that obtained when it is inserted into a real blood vessel, etc. The lower limit of the coefficient of static friction has no particular limit. For example, it is preferably 0.01 or more and more preferably 0.02 or more.

Coefficient of static friction of a hydrogel structure is measured at a severed plane prepared by severing the hydrogel structure at the center of the hollow tube in the longitudinal direction. For example, coefficient of static friction can be measured as follows: a probe is dropped to a portion corresponding to a blood vessel for a point contact using a ball-on-plate method by a surface texture measuring device (TYPE: 38, manufactured by SHINTO Scientific Co., Ltd.). The coefficient of static friction is preferably uniform over the entire of the inner wall of a hollow tube.

The coefficient of static friction of at least a part of the inner wall of the hollow tubular form of the hydrogel structure can be adjusted. For example, a surfactant, etc. usable for a solvent, oil, or a lubricant for wet drawing is applied to the inside of the hydrogel structure to adjust it. These can be applied to the inner wall of a hydrogel structure or caused to flow in a tube in a liquid form.

The solvent has no particular limit and can be suitably selected to suit to a particular application. For example, water and an organic solvent are usable. These can be used alone or in combination. Of these, an organic solvent is preferable in order to prevent the solvent from being absorbed into a hydrogel structure and a solvent having a high boiling point is preferable in order to prevent being dried.

The oil has no specific limit and can be suitably selected to suit to a particular application. For example, synthetic oil such as mineral oil and silicone, vegetable oil, wax, and animal oil are usable.

The surfactant has no particular limit and can be suitably selected to suit to a particular application. For example, anionic surfactants, nonionic surfactants, cationic surfactants, and amphoteric surfactants are usable. These can be used alone or in combination. Of these, nonionic surfactants are preferable considering that it is not easily affected by electrolyte in a hydrogel structure.

The nonionic surfactant has no particular limit and can be suitably selected to suit to a particular application.

Specific examples include, but are not limited to, polyoxyethylene alkyl ether, polyoxyethylene alkyl phenyl ether, polyoxyethylene alkyl phosphoric acid ester, polyoxyethylene aliphatic acid ester, sorbitan aliphatic acid ester, polyoxyethylene sorbitan aliphatic acid ester, aliphatic acid monoglyceride, sucrose aliphatic acid esters, and higher aliphatic acid alkanol amide.

The anionic surfactant has no particular limit and can be suitably selected to suit to a particular application.

Specific examples include, but are not limited to, metal salts, ammonium salts, amine salts, aminoalcohol salts, magnesium salts, and basic amino acid salts of alkyl sulfate, alkyl sulfate ether, alkyl sulfate amide ether, alkyl sulfate aryl polyether, sulfuric acid monoglyceride, alkyl sulfonate, alkylamide sulfonate, alkylaryl sulfonate, olefin sulfonate, paraffin sulfonate, alkyl sulfo succinate, alkylether sulfo succinate, alkylamide sulfo succinate, alkyl succine amide acid, alkyl sulfo acetate, alkyl phosphate, alkyl phosphate ether, acyl sarcosine, acyl isethionate, and acyl-N-acyl taurine.

The cationic surfactant has no particular limit and can be suitably selected to suit to a particular application.

Specific examples include, but are not limited to, distearyl dimethylammonium chloride, stearyldimethyl benzylammonium chloride, stearyl trimethyl ammonium chloride, behenyl trimethyl ammonium chloride, cetyl trimethyl ammonium chloride, myristyldimethyl benzyl ammonium chloride, ethyl acetate lanoline aliphatic acid amino propylethyl dimethylammonium, dicocoyl dimethylammonium chloride, lauryl trimethylammonium chloride, and ethyl sulfate branched aliphatic acid aminopropyl ethyldimethyl ammonium.

The amphoteric surfactant has no particular limit and can be suitably selected to suit to a particular application. Examples are amide amino acid type amphoteric surfactants having an alkyl group, alkenyl group, or acyl group having 8 to 24 carbon atoms, imidazoline type amphoteric surfactant of secondary or tertiary amides, carbobetaine-based, amide betaine-based, sulfobetaine-based, hydroxy sulfobetaine-based, or amidesulfo betaine-based amphoteric surfactants having an alkyl group, an alkenyl group, or an acyl group having 8 to 24 carbon atoms. Specific examples include, but are not limited to, 2-alkyl-N-carboxydimethyl-N-hydroxyethylimidazolinium betaine, staryldihydroxyethylbetaine, laurylhydroxysulfobetaine, bis(stearyl-N-hydroxyethyl imidazokine)chloroacetate complex, lauryldimethylamino betaine acetate, cocoylamide propyl betaine, and cocoyl alkylbetaine.

The hydrogel structure preferably satisfies at least one of the following (1) and (2).

(1): At least a part of the hollow tubular structure is adjacent to a hydrogel (second hydrogel object) having a modulus of elasticity different from that of a hydrogel (first hydrogel object) constituting the hollow tubular structure.

(2): the hollow tubular structure is formed of at least two kinds of hydrogels having different modulus of elasticity.

The hydrogel structure (first hydrogel object) preferably has a modulus of elasticity of from 0.1 to 1 MPa and more preferably from 0.2 to 0.8 MPa at 20 percent compression. The modulus of elasticity can be measured by using a universal tester (AG-I, manufactured by Shimadzu Corporation), a load cell 1 kN, and a compression jig for 1 kN while pressing cylindrical metal having a diameter of 1 mm into the hydrogel structure containing water as the main ingredient. The stress against the compression applied to the load cell is recorded in a computer and the stress against displacement is plotted to measure the modulus of elasticity. The moisture content of the hydrogel structure is adjusted to control modulus of elasticity.

If the hydrogel structure includes the hydrogel object (first hydrogel object) 52 having the hollow tubular structure and a hydrogel object (second hydrogel object) having a modulus of elasticity different from that of the hydrogel object 52 as illustrated in FIGS. 2A and 2B, the second hydrogel object 53 illustrated in FIG. 2A and a swollen part (second hydrogel object) 55 illustrated in FIG. 2B has a modulus of elasticity of from 0.005 to 0.1 MPa and more preferably from 0.01 to 0.05 MPa at 20 percent compression. In addition, the compression strength at 70 percent compression is preferably from 0.3 to 1 MPa and more preferably from 0.4 to 0.7 MPa.

When the modulus of elasticity at a part of the hydrogel structure is defined as X (MPa) and the modulus of elasticity at another part adjacent to the part of the hydrogel structure is defined as Y (MPa), the absolute value (|X−Y|) of the change in modulus of elasticity is 0.1 MPa or greater and preferably 0.11 MPa or greater. When the absolute value (|X−Y|) of the change in modulus of elasticity is 0.1 MPa or greater, it is possible to reproduce the texture of a blood vessel lesion model as illustrated in FIG. 2B, which has a portion such as aneurysm in a blood vessel having a modulus of elasticity lower than that of a normal blood vessel since the single hydrogel structure has different modulus of elasticity therein.

The moisture content of the hydrogel structure including the hollow tubular structure is lower than that of the hydrogel (second hydrogel object) having a modulus of elasticity different from that of the hydrogel structure (first hydrogel object). Therefore, the modulus of elasticity of the hydrogel structure can be set to be higher than the modulus of elasticity of the hydrogel having a modulus of elasticity different from the hydrogel structure. For this reason, the reproducibility of the texture of a real blood vessel is excellent.

The moisture content of the hydrogel structure (first hydrogel object) including the hollow tubular structure has no particular limit and can be suitably selected to suit to a particular application. For example, it is preferably from 30 to 75 percent by mass.

The moisture content of the hydrogel structure (second hydrogel object) having a modulus of elasticity different from that of the hydrogel structure has no particular limit and can be suitably selected to suit to a particular application. For example, it is preferably from 50 to 90 percent by mass.

The moisture content can be measured using, for example, a (heating and drying) moisture analyzer (MS-70, manufactured by A&D Company, Limited).

Optionally, water, polymers, mineral, organic solvents, and other components are mixed by a suitable method to produce ink as hydrogel precursor. Thereafter, this ink is cured by a suitable method to prepare the hydrogel structure.

Polymer

The polymer has no particular limit and can be suitably selected to suit to a particular application. For example, water-soluble polymers are preferable because the hydrogel includes water as the main component. Since the water-soluble polymer is contained, it is possible to maintain the strength of a hydrogel containing water as the main component.

Water-solubility of the water-soluble polymer means that, for example, when 1 g of the water-soluble polymer is mixed with 100 g of water and stirred at 30 degrees C., 90 percent by mass or more of the polymer is dissolved in water.

As the polymer, polymers having, for example, an amide group, an amino group, a hydroxyl group, a tetramethyl ammonium group, a silanol group, an epoxy group, etc. are suitable.

Homopolymer (monopolymer) and heteropolymers (co-polymers) can be the polymer. These can be non-modified. Also, known functional groups can be introduced into these.

In addition, the polymer may take a salt form. Of these, homo polymers are preferable.

The polymer can be obtained by polymerizing a polymerizable monomer. The polymerizable monomer is described in the method of manufacturing a hydrogel structure, which is described later.

The water-soluble polymer is prepared by polymerization of a polymerizable monomer. Specific examples include, but are not limited to, acrylamide, N-substituted acrylamide derivative, N,N-di-substituted acrylamide derivative, N-substituted methacrylamide derivative, and N,N-di-substituted methacrylamide derivative. These can be used alone or in combination.

When the polymerizable monomer is polymerized, water-soluble polymers having an amide group, an amino group, a hydroxyl group, a tetramethyl ammonium group, a silanol group, an epoxy group, etc. are obtained.

The water-soluble polymer having an amide group, an amino group, a hydroxyl group, a tetramethyl ammonium group, a silanol group, an epoxy group, etc. are advantageous to maintain the strength of an aqueous gel.

There is no specific limitation to the proportion of the polymer and it can be suitably selected to suit to a particular application. It is preferably from 0.5 to 20 percent by mass to the total content of the hydrogel structure.

Mineral

There is no specific limitation to the mineral and it can be suitably selected to suit to a particular application. For example, since the main component of the hydrogel is water, laminate clay minerals uniformly dispersible in water on the level of primary crystal are preferable and water swellable clay minerals are more preferable.

In the water swellable clay mineral, crystal having a two-dimensional disk-like form having unit lattices in the crystal are piled up. When the water swellable clay mineral is dispersed in water, the mineral is separated into each signal layer of crystal having a disk-like form.

The water swellable clay mineral has no particular limit and can be suitably selected to suit to a particular application. Examples are water swellable smectite and water swellable mica. These can be used alone or in combination. Of these, water swellable hectorite containing sodium as an interlayer ion, water swellable montmorillonite, water swellable saponite, and water swellable synthesized mica are preferable. Water swellable hectorite is more preferable since bolus having a high elasticity can be obtained. "Water swellable" means that water molecules are inserted between layers of lamellar clay mineral so that it can be dispersed in water.

The mineral can be appropriately synthesized or is available on the market.

The product available on the market are not particularly limited and can be suitably selected to suit to a particular application.

Specific examples include, but are not limited to, synthesized hectorite (laponite XLG, manufactured by Rock-Wood), SWN (manufactured by Coop Chemical Ltd.), and fluorinated hectorite SWF (manufactured Coop Chemical Ltd.). These can be used alone or in combination.

The proportion of the mineral is not particularly limited and can be suitably selected to suit to a particular application. For example, it is preferably from one percent by mass to percent by mass and more preferably from 1 percent by mass to 25 percent by mass to the total content of a hydrogel structure in terms of modulus of elasticity and hardness of hydrogel structure.

Organic Solvent

In the present disclosure, an organic solvent can be added to enhance moisture retention of the hydrogel structure.

An example of the organic solvent is a water-soluble organic solvent. The water-solubility of the water-soluble organic solvent means that the organic solvent is soluble in water in an amount of 30 percent by mass or more.

The water-soluble organic solvent is not particularly limited and can be suitably selected to suit to a particular application.

Specific examples include, but are not limited to, alkyl alcohols having one to four carbon atoms such as methyl alcohol, ethyl alcohol, n-propyl alcohol, isopropyl alcohol, n-butyl alcohol, sec-butyl alcohol, and tert-butyl alcohol, amides such as dimethylformamide and dimethylacetoamide, ketones or ketone alcohols such as acetone, methylethylketone, and diacetone alcohol, ethers such as tetrahydrofuran and dioxane, multi-valent polyols such as ethylene glycol, propylene glycol, 1,2-propane diol, 1,2-butanediol, 1,3-butanediol, 1,4-butanediol, diethylene glycol, triethylene glycol, 1,2,6-hexane triol, thioglycol, hexylene glycol, and glycerin, polyalkylene glycols such as polyethylene glycol and polypropylene glycol, lower alcohol ethers of polyols such as ethylene glycol monomethyl (or ethyl) ether, diethylene glycol methyl (or ethyl) ether, and triethylene glycol monomethyl (or ethyl) ether, alkanol amines such as monoethanol amine, diethanol amine, and triethanol amine, N-methyl-2-pyrolidone, 2-pyrolidone, and 1,3-dimethyl-2-imidazoline. These can be used alone or in combination. Of these, in terms of moisture retention, polyols, glycerin, and propylene glycol are preferable and glycerin and propylene glycol are more preferable.

The proportion of the organic solvent is preferably from 10 to 50 percent by mass to the total content of the hydrogel structure. When the proportion is not less than 10 percent by mass, the hydrogen is sufficiently prevented from being dried. In addition, when the proportion is not greater than 50 percent by mass, mineral is uniformly dispersed.

Water

As the water, for example, deionized water, ultrafiltered water, reverse osmosis water, pure water such as distilled water, and ultra pure water can be used.

It is suitable to dissolve or disperse other components such as organic solvents in the water to impart moisture retention, antibiotic property, or electroconductive property, and adjust hardness.

The proportion of the water is preferably from 10 to 99 percent by mass, more preferably from 50 to 98 percent by mass, and furthermore preferably from 60 to 97 percent by mass to the total content of a hydrogel structure.

Other Components

The other optional ingredients has no particular limit and can be suitably selected to suit to a particular application. For example, stabilizers, surface treatment chemicals, polymerization initiators, colorants, viscosity modifiers, cohesion imparting agents, anti-oxidants, anti-aging agents, cross-linking promoters, ultraviolet absorbents, plasticizers, preservatives, dispersants, and polymerization promoters.

The surface of the hydrogel structure of the present disclosure is preferably covered with a transparent rigid object.

Figure 3A:
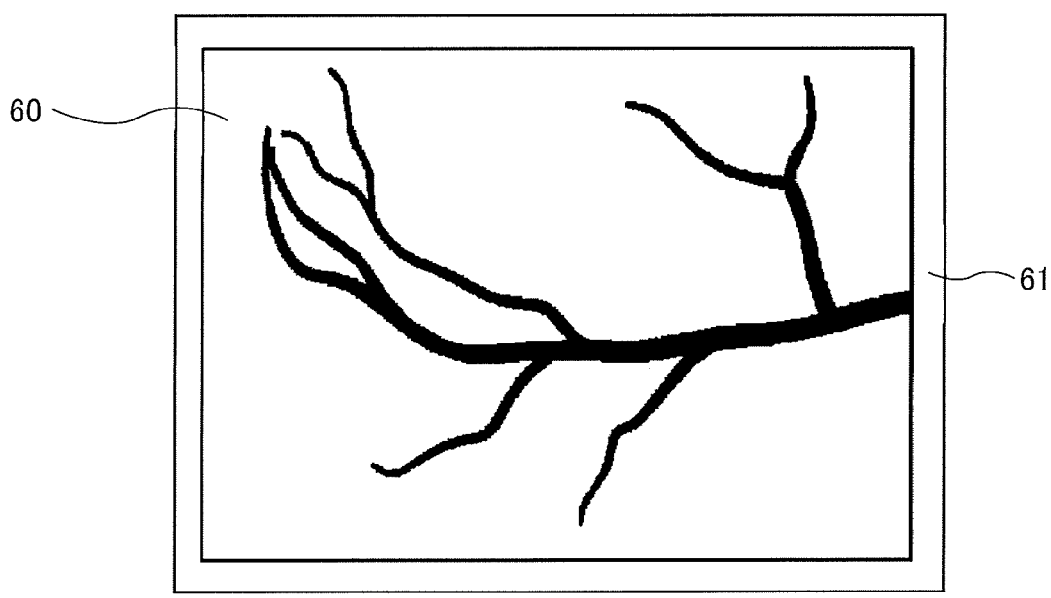
FIG. 3A is a schematic diagram illustrating a top view of an example of the hydrogel structure to which a transparent rigid object is attached.
Figure 3B:
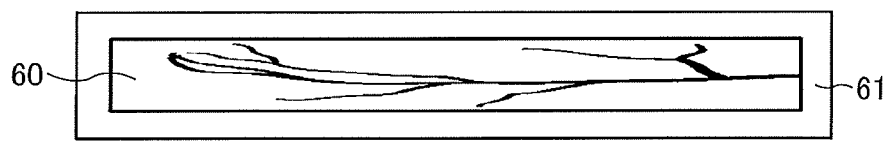
FIG. 3B is a schematic diagram illustrating a side view of an example of the hydrogel structure to which a transparent rigid object is attached.

FIG. 3A is a schematic diagram illustrating an example of a hydrogel structure 60 on which a transparent rigid object 61 is mounted. FIG. 3B is a schematic diagram illustrating another example of the hydrogel structure 60 on which the transparent rigid object 61 is mounted.

As illustrated in FIGS. 3A and 3B, if the surface is covered with the transparent rigid object 61, the form of the blood vessel can be well maintained. Also, handling property during surgery and storage stability (anti-drying and asepticus) of the blood vessel model can be improved. That is, moisture vapor transmission rate or oxygen transmission rate of the rigid object 61 can be reduced. In addition, the outlook of the blood vessel model can be improved.

The material forming the rigid object has no particular limit and can be suitably selected to suit to a particular application. For example, plastic material such as acrylic resin and polycarbonate resin having a high level of transparency and inorganic material such as glass having a high level of transparency are suitable.

There is no specific limitation to the form and the average thickness of the rigid object and it can be suitably selected to suit to a particular application.

The moisture vapor transmission rate is preferably 500 $g/m^2 \cdot d$ or less. The moisture vapor transmission rate can be measured by, for example, a moisture vapor transmission rate meter (Lyssy L80, manufactured by SYSYTECH) according to JIS K7219.

The oxygen transmission rate is preferably 100,000 $cc/m^2/hr/atm$ or less.

The oxygen transmission rate can be measured by, for example, a differential gas transmission rate meter (Lyssy L100, manufactured by SYSYTECH) according to JIS Z1702.

Practice Tool for Medical Procedure

The practice tool for medical procedure of the present disclosure includes at least one of a hydrogel structure, a blood vessel model, a structure, and an internal organ model, at least one of a catheter and an endoscope, and other optional members.

The catheter has no particular limit and can be suitably selected to suit to a particular application. For example, catheter for angiography, balloon catheter, cerebral blood vessel catheter, cancer catheter curing, indwelling vascular catheter, indwelling suction catheter, and urethral indwelling catheter are suitable.

The endoscope has no specific limit and can be suitably selected to suit to a particular application. For example, throat cavity endoscope, bronchoscope, upper gastrointestinal endoscope, duodenoscope, enteroscope, large intestine endoscope, thoracoscope, cystoscope, cholangioscope, and angioscope are usable.

The hydrogel structure, the blood vessel model, and the internal organ model of the present disclosure can be suitably applied to training for medical procedure of catheter intubation or a simulation before surgery.

The training for medical procedure of catheter intubation means a practice to insert a catheter into a blood vessel model and cause it to reach a target location. This training includes changing the thickness of a catheter to suit to a particular application and providing a stent, wire, and a balloon at a distal end to use it for treatment at an assumed dispersed part.

Selecting a most suitable catheter according to the form of a blood vessel is part of the training. It is useful to handle one or more catheters, the hydrogel structure of the present disclosure, etc. as a set.

It is preferable that such a training provide a feeling of the inside of a real blood vessel. The blood vessel or the structure of the present disclosure is formed of hydrogel and has a texture very close to that of a live body. In addition, it is also suitable to provide a mechanism to cause liquid to flow in the hydrogel structure to offer a training conducted in a state in which blood is flowing.

Conventional blood vessel models are not transparent in most cases. Training using such a model requires irradiation of X-rays to render the blood vessel visible.

However, the training using the model of the present disclosure obviates the need for the irradiation of X-rays, thereby reducing the risk of users to be exposed to X-ray.

Method of Manufacturing Hydrogel Structure

A first embodiment of the method of manufacturing the hydrogel structure of the present disclosure has no particular limit. For example, a pillar-like core part (support) is formed using a core part forming material (support forming material, active energy ray curable liquid composition) and a tube-like portion is formed to cover the pillar-like core part with a hydrogel forming material. Thereafter, the pillar-like core part is removed to manufacture the hydrogel structure. At this point, it is preferable to manufacture the hydrogel structure utilizing an additive manufacturing method (in which a layer forming process and a layer curing process repeated to laminate layers to fabricate a solid freeform fabrication object) such as known material jetting method. It is sufficient that the pillar-like core part is at least partially covered with the hydrogel forming material. However, it is preferable that the entire of the pillar-like core part be covered therewith. In addition, it is preferable that the core part forming material (support forming material) and the hydrogel forming material be the active energy ray curable composition. The number of the repetition of the processes is not simply determined because the number of times depends on the size, shape, structure, etc. of the hydrogel structure to be manufactured. However, if the thickness per layer is in the range of from 10 to 50 µm, the structure can be fabricated with good precision free of peeling-off.

In a second embodiment of the method of manufacturing the hydrogel structure of the present disclosure, a hydrogel structure having a hollow tubular structure is manufactured. It includes forming a pillar-like core part using a core part forming material and covering the pillar-like core part with a hydrogel forming material to form a tubular portion. The core part forming material includes an active energy ray curable composition. The cured object of the active energy ray curable composition is liquefied by heat. The method also includes other optional processes.

Unlike the first embodiment of the method of manufacturing the hydrogel structure, the second embodiment of the method of manufacturing the hydrogel structure includes no process of removing the pillar-like core part.

Below is a detailed description of the method of manufacturing a hydrogel structure according to the material jetting method mentioned above.

Layer Forming Process and Layer Forming Device

The layer forming process includes discharging a hydrogel forming material containing water and a polymerizable monomer and removing a support forming material to be removed later to form a layer formed of these materials.

The support forming material is applied to a site different from that of the hydrogel forming material and forms a support to support the hydrogel structure portion after it is cured. In the present disclosure, to form a hollow tubular structure, the upper part of the hollow tubular structure is supported by the corresponding support during lamination. "Site different from that of the hydrogel forming material" means that the application position of the support forming material and the application position of the hydrogel forming material do not overlap each other. However, both sites can be adjacent to each other.

The method of applying the forming material as the layer forming process has no particular limit as long as liquid droplets are applied to a target site with a suitable precision and it can be suitably selected to suit to a particular application. For example, a dispenser method, a spray method, an inkjet method, etc. can be suitably selected to a particularly application. Known devices are suitably used to execute these methods.

Of these, the dispenser method has an excellent quantitative property but the application area is small. The spray method is capable of simply forming a fine discharging material, has a wide application area, and demonstrates excellent applicability but the quantitative property thereof is poor so that powder material scatters due to the spray stream. For this reason, in the present disclosure, the inkjet method is particularly preferable. The inkjet method has a good quantitative property in comparison with the spray method and a wider application area in comparison with the dispenser method. Accordingly, the inkjet method is preferable to accurately and efficiently form a complex solid shape.

When utilizing the inkjet method, there are provided nozzles capable of discharging the forming materials. As the nozzle, nozzles for use in a known inkjet printer can be suitably used.

Hydrogel Forming Material (Hydrogel Precursor)

The hydrogel forming material contains water and a polymerizable monomer. It also preferably contains a mineral and an organic solvent and furthermore optionally includes a polymerizable monomer and other optional components.

As water, the mineral, the organic solvent, and the other optional components, the same as those for the hydrogel structure mentioned above can be used.

Polymerizable Monomer

The polymerizable monomer includes a compound having at least one unsaturated carbon and carbon bond. A polymerizable monomer polymerized upon application of an active energy ray such as ultraviolet rays and electron beam is preferable.

For example, a mono-functional monomer and a polyfunctional monomer are suitable as the polymerizable monomer. These can be used alone or in combination.

The polyfunctional monomer includes, for example, a bi-functional monomer, a tri-functional monomer, and a tetra- or higher functional monomer.

The mono-functional monomer is a compound having a single unsaturated carbon-carbon bond. Specific examples include, but are not limited to, acrylamides, N-substituted acrylamide derivatives, N,N-di-substituted acrylamide derivatives, N-substituted methacrylamide derivatives, N,N-di-substituted methacrylamide derivatives, and other mono-functional monomers. These can be used alone or in combination.

The N-substituted acrylamide derivatives, N,N-di-substituted acrylamide derivatives, N-substituted methacrylamide derivatives, and N,N-di-substituted methacrylamide derivatives include, for example, N,N-dimethyl acryl amide (DMAA) and N-isopropyl acryl amide.

Specific examples of the mono-functional polymerizable monomer include, but are not limited to, 2-etylhexyl(meth) acrylate, 2-hydroxyethyl(meth)acrylate, 2-hydroxypropyl (meth)acrylate, acryloylmorphorline (ACMO), caprolactone-modified tetrahydrofurfuryl(meta)acrylate, isobonyl (meth)acrylate, 3-methoxybutyl(meth)acrylate, tetrahydro furfuryl(meth)acrylate, lauryl(meth)acrylate, 2-phenoxyethyl (meth)acrylate, isodecyl(meth)acrylate, isooctyl(meth) acrylate, tridecyl(meth)acrylate, caprolactone(meth)acrylate, ethoxyfied nonylphenol(meth)acrylate, and urethane (meth)acrylate. These can be used alone or in combination.

Water-soluble polymers having an amide group, an amino group, a hydroxyl group, a tetramethyl ammonium group, a silanol group, an epoxy group, etc can be obtained by polymerizing the mono-functional monomers mentioned above.

Water-soluble polymers having an amide group, an amino group, a hydroxyl group, a tetramethyl ammonium group, a silanol group, an epoxy group, etc. are advantageous to maintain the strength of a blood vessel model.

Specific examples of the bi-functional monomer include, but are not limited to, tripropylene glycol di(meth)acrylate, triethylene glycol di(meth)acrylate, tetraethylene glycol di(meth)acrylate, polypropylene glycol di(meth)acrylate, neopentyl glycol hydroxy pivalic acid ester di(meth)acrylate, hydroxypivalic acid neopentyl glycol ester di(meth) acrylate, 1,3-butanediol di(meth)acrylate, 1,4-butanediol di(meth)acrylate, 1,6-hexanediol di(meth)acrylate, 1,9-nonane diol(meth)acrylate, diethylene glycol di(meth)acrylate, neopentyl glycol di(meth)acrylate, tripropylene glycol di(meth)acrylate, caprolactone-modified hydroxy pivalic acid neopentyl glycol ester di(meth)acrylate, propoxinated neopentyl glycol di(meth)acrylate, ethoxy-modified bisphenol A di(meth)acrylate, polyethylene glycol 200 di(meth) acrylate, polyethylene glycol 400 di(meth)acrylate, and methylenebis acrylamide. These can be used alone or in combination.

Specific examples of the tri-functional monomers include, but are not limited to, trimethylol propane tri(meth)acrylate, pentaerythritol tri(meth)acrylate, triallyl isocyanate, tris(2-hydroxyethyl)isocyanulate tri(meth)acrylate, ethoxyfied trimethylol propane tri(meth)acrylate, propoxyfied trimethylol propane tri(meth)acrylate, and propoxyfied glyceryl tri(meth)acrylate. These can be used alone or in combination.

Specific examples of the tetra- or higher monomers include, but are not limited to, pentaerythritol tetra(meth) acrylate, ditrimethylol propanetetra(meth)acrylate, dipentaerythritol hydroxypenta(meth)acrylate, ethoxyfied pentaerythritol tetra (meth)acrylate, penta(meth)acrylate ester, and dipentaerythritol hexa(meth)acrylate. These can be used alone or in combination.

The proportion of the mono-functional monomer is not particularly limited and can be suitably selected to suit to a particular application. For example, it is preferably from 1 to percent by mass and more preferably from 1 to 5 percent by mass to the total content of the hydrogel forming material. When the proportion is in the range of from 1 to 10 percent by mass, dispersion stability of the mineral in the hydrogel forming material is maintained and drawing property of a hydrogel structure is enhanced. The drawing property means that when a hydrogel structure is drawn, the hydrogel structure is not fractured (broken) but extended.

The proportion of the poly-functional monomer is preferably from 0.001 to 1 percent by mass and more preferably from 0.01 to 0.5 percent by mass to the total content of the hydrogel forming material. When the proportion is in the range of from 0.001 to 1 percent by mass, it is possible to control the modulus of elasticity and hardness of the obtained hydrogel structure in a suitable range.

The proportion of the polymerizable monomer is preferably from 0.5 to 20 percent by mass to the total content of the hydrogel forming material. When the proportion is from 0.5 to 20 percent by mass, the strength of the hydrogel structure can be closer to that of a human internal organ.

Polymerization Initiator

The polymerization initiator has no particular limit and can be suitably selected to suit to a particular application. For example, a photopolymerization initiator and thermal polymerization initiator are usable.

As the photopolymerization initiator, any material can be used which produces a radical upon irradiation of light (in particular, ultraviolet rays having a wavelength in a range of 220 to 400 nm).

The photopolymerization initiator has no particular limit and can be suitably selected to suit to a particular application.

Specific examples include, but are not limited to, acetophenone, 2,2-diethoxyacetophenone, p-dimethylaminoacetone, benzophenone, 2-chlorobenzophenone, p,p'-dichlorobenzophenone, p,p-bisdiethylamonobenzophenoen, Michler's Ketone, benzyl, benzoin, benzoin methyl ether, benzoin ethyl ether, benzoin isopropyl ether, benzoin-n-propylether, benzoin isobutylether, benzoin-n-butylether, benzylmethyl ketal, thioxanthone, 2-chlorothioxanthone, 2-hydroxy-2-methyl-1-phenyl-1-one, 1-(4-isopropylphenyl)-2-hydroxy-2-methylpropane-1-one, methylbenzoyl formate, 1-hydroxy cyclohexyl phenylketone, azobisisobutylo nitrile, benzoylperoxide, and di-tert-butylperoxide. These can be used alone or in combination.

The thermal polymerization initiator has no particular limitation and can be suitably selected to suit to a particular application. Examples thereof are azo-based initiators, peroxides initiators, persulfate initiators, and redox (oxidation-reduction) initiators. These can be used alone or in combination. Of these, peroxides initiators are preferable.

The peroxides initiators has no particular limit and can be suitably selected to suit to a particular application.

Specific examples include, but are not limited to, potassium persulfate, sodium persulfate, ammonium persulfate, sodium peroxodisulfate, and potassium peroxodisulfate. These can be used alone or in combination. Of these, potassium peroxodisulfate is preferable.

Curing Process and Curing Device

The curing process includes irradiating a predetermined area of the hydrogel forming material layer and the support forming material layer formed by the curing device with an active energy rays to cure the area.

As the curing device to cure the layers, for example, an ultraviolet (UV) ray irradiating lamps, electron beam, etc. are used. The curing device preferably includes a mechanism to remove ozone.

The ultraviolet ray irradiating lamp includes, for example, a high pressure mercury lamp, an ultra high pressure mercury lamp, a metal halide lamp, and an ultraviolet ray light-emitting diode (UV-LED).

The ultra-high pressure mercury lamp is a point light source but if the DeepUV type combined with an optical system to have a high light use efficiency rate is used, the lamp is capable of emitting light in a short-wavelength range.

Since the metal halide lamp has a wide range of wavelength, it is suitable for colored materials. Halogenated materials of metal such as Pb, Sn, and Fe are used therefor and can be suitably selected to absorption spectrum of a photopolymerization initiator. The lamp for use in the curing has no particular limit and can be suitably selected to suit to a particular application. Lamps available on the market can be used. Examples are H lamp, D lamp, and V lamp (manufactured by Fusion System).

There is no specific limitation to the emitting wavelength of the ultraviolet light-emitting diode and it can be suitably selected to suit to a particular application. In general, wavelengths of 365 nm, 375 nm, 385 nm, 395 nm, and 405 nm are used. Taking into account the impact on the color of a solid freeform fabrication object, short wavelength irradiation is advantageous to increase absorption of a polymerization initiator. Of these, since the solid freeform fabrication object of the present disclosure as a hydrogel easily affected by heat energy is used, it is preferable to use an ultraviolet light-emitting diode (UV-LED) generating less heat as an ultraviolet (UV) irradiating lamp.

The hydrogel material layer after it is cured is preferably a hydrogel which contains water and ingredients soluble in the water in a three-dimensional network structure formed by complexing a polymer and a mineral. The hydrogel has good expansibility and can be peeled off without breakage, so that treatment after fabrication is significantly simplified.

Support (Core Part) Forming Material

The support forming material (active energy ray curable liquid composition) has no particular limit as long as it can support the hydrogel structure of the present disclosure. In terms of removability of the support present in the hollow portion after lamination, it is preferable to use an article having a solubility in a solvent or an article liquefied as a result of phase change caused by heating. Since the hydrogel structure of the present disclosure is a hydrogel, dipping the hydrogel structure in water during removal of the support forming material is not desirable because the fabricated object may swell. For this reason, it is preferable to select a support forming material soluble in a solvent in which the hydrogel is not dissolved. In addition, the support material is preferably solid at 25 degrees C. and is phase-changed into liquid at 50 degrees C. When the support forming material is a phase-changeable material, the support forming material is easily removed after the hydrogel structure is formed.

In addition, the support forming material (core part forming material) to support the inside of the hollow form in the hydrogel structure of the present disclosure and the support forming material to support the exterior of the structure can be the same or different from each other. Also, it is not necessary to fill the inside of the hollow portion with the support forming material. A support form that can minimally support the hollow portion suffices. In this case, removing the support form is efficient in comparison with the case in which the hollow portion is filled with the support form.

The support forming material contains a polymerizable monomer and other optional material such as a polymerization initiator and a colorant. The material mentioned above for the hydrogel forming material can be used as the polymerizable monomer and the other optional material for the support forming material.

The phase-changeable material is liquid before it is cured and solidified upon irradiation of an active energy ray such as ultraviolet rays like the case of the hydrogel. For example, articles are suitable which are solid at room temperature (25 degrees C.) and liquid at 60 degrees C.

In one embodiment, it is preferable to contain a monofunctional ethylenic unsaturated monomer (A) (hereinafter referred to as monomer (A)) having a straight chain having 14 or more carbon atoms, a polymerization initiator (B), and a solvent (C) and more preferable to furthermore contain a solvent (D) in which the monomer (A) is poorly dissolved.

Mono-functional Ethylenic Unsaturated Monomer (A) Having Straight Chain Having 14 or More Carbon Atoms The mono-functional ethylenic unsaturated monomer (A) having a straight chain having 14 or more carbon atoms has no particular limit and can be suitably selected to suit to a particular application.

Specific examples include, but are not limited to, acrylate such as stearylacrylate and docosylacrylate; methacrylate such as stearylmethacrylate and docosylmethacrylate; acylamide such as palmityl acrylamide and starylacrylamide, and vinyl such as vinylstearate and vinyl docosylate. These can be used alone or in combination. Of these, in terms of photoreactivity, acrylate, and acrylamide derivatives are preferable. In terms of solubility in a solvent, stearylacrylate is more preferable.

Examples of the polymerization reaction of the monomer (A) are radical polymerization, ion polymerization, coordination polymerization, and ring-opening polymerization. Of these, in order to control the polymerization reaction, radical polymerization is preferable. For this reason, the monomer (A) having a hydrogen bond power is preferably ethylenic unsaturated monomers. Of these, in terms of solubility, mono-functional ethylenic unsaturated monomers are preferable.

Polymerization Initiator (B)

The polymerization initiator (B) has no specific limit and can be suitably selected to suit to a particular application. For example, thermal polymerization initiators and photopolymerization initiator are usable. Of these, photopolymerization initiators are preferable to fabricate a solid object.

As the photopolymerization initiator, any material can be used which produces a radical at irradiation of light (ultraviolet rays having a wavelength in a range of from 220-400 nm).

Specific examples of the photopolymerization initiator include, but are not limited to, acetophenone, 2,2-diethoxyacetophenone, p-dimethylaminoacetone, benzophenone, 2-chlorobenzophenone, p,p'-dichlorobenzophenone, p,p-bisdiethylamonobenzophenoen, Michler's Ketone, benzyl, benzoin, benzoin methylether, benzoin ethylether, benzoin isopropylether, benzoin-n-propylether, benzoin isobutylether, benzoin-n-butylether, benzylmethyl ketal, thioxanthone, 2-chlorothioxanthone, 2-hydroxy-2-methyl-1-phenyl-1-one, 1-(4-isopropylphenyl)-2-hydroxy-2-methylpropane-1-one, methylbenzoyl formate, 1-hydroxy cyclohexyl phenylketone, azobisisobutylo nitrile, benzoylperoxide, and di-tert-butylperoxide. These can be used alone or in combination. It is preferable to select a photopolymerization initiator depending on the ultraviolet ray wavelength of an ultraviolet ray irradiator.

Solvent (C) Capable of Dissolving Monomer (A)

The solvent (C) has no particular limit as long as the solvent (C) can dissolve the monomer (A) and can be suitably selected to suit to a particular application. In order to prevent significant decrease of crystallinity of polymer side chain, it is preferable to have a straight chain having 6 or more carbon atoms.

Specific examples of the solvent (C) having a straight chain having 6 or more carbon atoms include, but are not limited to, esters such as hexyl acetate and octyl acetate and alcohols such as hexanol, decanol, and dodecanol. Of these, alcohol having a straight chain is preferable in order to enhance the support power to the modeling material of a cured object. It is possible to structure a hydrogen bond by a hydroxyl group while maintaining crystallinity of the polymer side chain. Moreover, alcohol having a straight chain having at least one hydroxyl group bonded to the primary carbon is preferable because it can prevent inhibition of crystallinity. 1-dodecanol is more preferable.

Solvent D in which Monomer (A) is not Easily Dissolved

The solvent (D) is added in order to relieve the warp of a support to be fabricated. If a solvent little or never soluble in a monomer is added, the internal stress occurring during the curing is considered to be distributed.

The solvent (D) has no particular limit as long as it can little or never dissolve the monomer (A) and can be suitably selected to suit to a particular application. When the monomer (A), the solvent (C), and the solvent (D) are mixed, the solvent (D) is preferably present as liquid compatible in a 60 degree C. environment. Moreover, polyol that can remain in a cured object without inhibiting crystallinity of the polymer side chain and decrease viscosity as ink for supporting material is more preferable.

Specific examples of the polyol include, but are not limited to, polyethers such as polyethylene glycol (PEG), polypropylene glycol (PPG), polybutylene glycol, a copolymer of ethylene oxide and propylene oxide, a copolymer of ethylene oxide and butylene oxide, and polytetramethylene ether glycol (PTMEG), polyesters such as polycarprolactone diol (PCL), polycarbonate diol, and polyester polyol formed of polyol and polybasic acid, castor oil, and acrylic polyol. These can be used alone or in combination. Of these, polypropylene glycol is preferable.

As the copolymer, a block copolymer, a random copolymer, or a combination thereof can be used in combination.

The degree of polymerization of polyol has no particular limit and can be suitably selected to suit to a particular application. For example, the degree of polymerization is preferably from 10 to 10,000, more preferably from 100 to 5,000, and particularly preferably from 1,000 to 3,000. When the degree of polymerization is 10 or greater, the polyol is not vaporized at heating and can remain present in a cured object. In addition, when the degree of polymerization is 10,000 or less, the polyol can be present in liquid without excessively increasing viscosity at 60 degrees C.

The criteria of capability of dissolving the monomer (A) is determined based on whether the monomer (A) having an amount of 1 percent by mass of the solvent can be dissolved therein. That is, the solvent (C) can dissolve the monomer (A) having 1 percent by mass or more of the dead weight of the solvent (C) while the solvent (D) cannot dissolve the monomer (A) having 1 percent by mass or more of the dead weight of the solvent (D).

The determination can be made whether or not non-dissolved monomer (A) remains after the monomer (A) of 1 percent by mass is loaded in the solvent (C) or the solvent (D) and stirred for 12 hours.

The support forming material (active energy ray curable liquid composition) preferably contains the mono-functional ethylenic unsaturated monomer (A) having a straight chain having 14 or more carbon atoms in an amount of from 20 to 70 percent by mass and more preferably from 30 to 60 percent by mass.

The active energy ray curable liquid composition of the present disclosure preferably contains the polymerization initiator (B) in an amount of from 0.5 to 10 percent by mass and more preferably from 3 to 6 percent by mass.

The active energy ray curable liquid composition of the present disclosure preferably contains the solvent (C) that can dissolve the monomer (A) in an amount of from to 70 percent by mass and more preferably from 30 to 60 percent by mass.

The active energy ray curable liquid composition of the present disclosure preferably contains the solvent (D) that can poorly dissolve the monomer (A) in an amount of from 0 to 40 percent by mass and more preferably from 10 to 30 percent by mass. When the amount is from 0 to 40 percent by mass, warp of the support can be relieved while the support forming material maintains its form. If the amount is outside the range specified above, the support forming material tends to be deformed due to the dead weight of the hydrogel structure and the external force applied during fabrication.

In addition, when the following relation is satisfied, warp can be suppressed while securing sufficient compression stress:

$$60<\{(Wc+Wd)/(Wa+Wc+Wd)\}<75$$

In the relation, Wa represents the mass of the monomer (A), Wc represents the mass of the solvent (C), and Wd represents the mass of the solvent (D).

To obtain a cured object from the support forming liquid material, for example, it is preferable to irradiate the support forming material with an ultraviolet ray in an amount of 200 mJ/cm$^2$ or greater using an ultraviolet irradiator. The same device as the device for use in curing the hydrogel structure can be used as the ultraviolet irradiator.

It is preferable that the temperature and humidity of a fabrication space be controlled from the beginning to the end of fabrication. It is to prevent moisture absorption or drying of a fabricated object or solidification of a precursor. Specifically, the temperature is 25 degrees C. or lower and the moisture is within from −5 to +5 percent of a target RH value. More preferably, the moisture is from 90 to 100 percent RH.

In addition, it is necessary to shield the surrounding in order not to leak ultraviolet rays emitted from an ultraviolet ray irradiator during fabrication. The shielding structure may shield all the light or selectively shield ultraviolet rays.

When the monomer (A) is irradiated with ultraviolet rays together with the polymerization initiator (B), the monomer (A) becomes a polymer and the solvent (C) is maintained in the polymer. The polymer (A) is solidified when the carbon chain is arranged in a 25 degree C. environment. If the solvent (C) is maintained in the polymer (A), contraction and warp ascribable to crystallization can be suppressed. In addition, the solvent (C) preferably has a straight chain having 6 or more carbon atoms in terms of curability.

In addition, the solvent (C) capable of dissolving the monomer (A) is preferably a non-reactive compound non-reactive with the polymerization initiator (B).

In the present disclosure, the solvent (C) capable of dissolving the monomer (A) is a solvent in which the monomer (A) is dissolved to form a uniform liquid.

In the present disclosure, the non-reactive compound is not chemically reactive even if irradiated with ultraviolet rays.

If the solvent (C) is non-reactive, it does not react under the presence of a photopolymerization initiator so that polymerization reaction of monomers and crystallization of the polymer side chain are not inhibited. Therefore, the non-reactive solvent (C) is preferable.

Surface Tension

The surface tension of the support forming material in the present disclosure has no particular limit and can be suitably selected to suit to a particular application. For example, the surface tension is preferably from 20 to 45 mN/m and more preferably from 25 to 34 mN/m at 25 degrees C. When the surface tension is 20 mN/m or greater, it is possible to prevent unstable jetting (deviation of jetting direction, no jetting, etc.) during fabrication. When the surface tension is 45 mN/m or less, a jetting nozzle for fabrication, etc. can be easily and completely filled with liquid. The surface tension can be measured by a surface tensiometer (automatic contact angle meter DM-701, manufactured by Kyowa Interface Science Co., LTD.), etc.

Viscosity

Viscosity at 25 degrees C. of the support forming material in the present disclosure is preferably 1,000 mPa·s or less, more preferably 300 mPa·s or less, furthermore preferably 100 mPa·s or less, particularly preferably from 3 to 20 mPa·s, and most preferably from 6 to 12 mPa·s. When the viscosity surpasses 1,000 mPa·s, the support forming material may not be discharged even if a head is heated. Viscosity can be measured by, for example, a rotation viscometer (VISCOMATE VM-150 III, manufactured by TOK1 SANGYO CO., LTD.) in a 25 degrees C. environment.

Removing Process and Removing Device

The removing process is to remove a support including the pillar-like core part.

The pillar-like core part can be removed due to heating causing liquefaction and using a solvent in which the tubular portion is insoluble. Being insoluble means that, for example, when 1 g of the tubular portion is mixed with 100 g of water at 30 degrees C. and stirred, 90 percent by mass or more of the tubular portion is not dissolved in water.

Other Processes and Other Devices

There is no specific limitation to the other optional processes and it can be suitably selected to suit to a particular application.

Specific examples include, but are not limited to, a layer-smoothing process, a peeling-off process, discharging stabilizing process, a process of cleaning a fabricated object, and a process of polishing a fabricated object.

Method of Manufacturing Solid Freeform Fabrication Object and Device for Manufacturing Solid Freeform Fabrication Object The method of manufacturing a solid freeform fabrication object (hydrogel structure) of the present disclosure includes manufacturing a solid freeform fabrication object using the active energy ray curable liquid composition mentioned above and other optional processes.

In addition, the method of manufacturing a solid freeform fabrication object (hydrogel structure) of the present disclosure includes laminating layers of the active energy ray curable liquid composition. The active energy ray curable liquid composition is laminated to form a cured object forming a support portion and the support portion is removed by heating after the additive manufacturing. Also, the method may include furthermore optional process.

Moreover, the device for manufacturing a solid freeform fabrication object in the present disclosure includes a container accommodating the active energy ray curable liquid composition, a discharging device to discharge the active energy ray curable liquid composition, a curing device to cure the active energy ray curable liquid composition discharged by the discharging device, and other optional devices.

As the active energy ray curable liquid composition, the same active energy ray curable liquid composition (support forming material for use in the layer forming process in the method of manufacturing the hydrogel structure) mentioned above can be used.

In addition, as the method of manufacturing a solid freeform fabrication object, it is preferable that the cured object of the active energy ray curable liquid composition form a support portion and the hydrogel structure of the present disclosure form the model part in the additive manufacturing.

The container accommodating the active energy ray curable composition can be used as an ink cartridge and an ink bottle. This obviates the need for direct contact with ink in the operation of ink conveying, ink replacement, etc. so that contamination of fingers and clothes are prevented.

Furthermore, inclusion of foreign matters such as dust in the ink can be also prevented. In addition, the container has no particular limit. Size, form, and material of the container can be suitably selected to suit to a particular application and usage. For example, it is preferable to use a light blocking material to block the light or cover the container with a light blocking sheet, etc.

Figure 4:
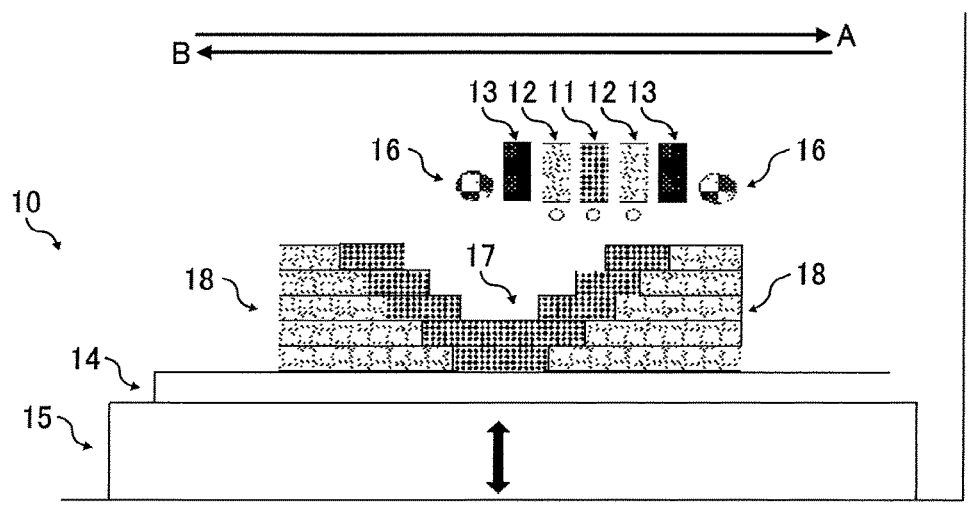
FIG. 4 is a schematic diagram illustrating an example of the process of manufacturing utilizing a solid freeform fabrication device for use in the method of manufacturing a hydrogel structure according to an embodiment of the present disclosure.

FIG. 4 is a schematic diagram illustrating an example of the solid freeform fabrication object manufacturing process using a device for manufacturing a three-dimensional (solid freeform fabrication) object for use in the method of manufacturing the hydrogel structure of the present disclosure.

A solid freeform fabrication device 10 includes head units 11 and 12 in which inkjet heads (forming material discharging device, discharging device) movable in both directions indicated by the arrows A and B and a fabricated object supporting substrate 14. A hydrogel forming material is jetted from the head unit 12 and a support forming material is jetted from the head unit 11 on the fabricated object supporting substrate 14. The hydrogel forming material is laminated while cured by a UV ray irradiator (curing device) 13 disposed adjacent to the head unit.

That is, the support forming material (supporting material) is jetted from the head unit 12 and solidified to form a first supporting layer having a pool part. Thereafter, the hydrogel forming material is jetted from the head unit 11 to the pool part of the first supporting layer and irradiated with UV rays to cure the hydrogel forming material.

Moreover, the cured part is smoothed by a smoothing member 16 to form a first solid freeform fabrication object layer.

Thereafter, the support forming material is jetted onto the first solid freeform fabrication object layer and solidified to form a second supporting layer having a pool part on the first supporting layer. The hydrogel forming material is jetted onto the pool part of the second supporting layer and irradiated with UV rays to form the second fabrication object layer on the first fabrication object layer followed by smoothing to manufacture a fabrication object 17.

When the smoothing member having a roller form is used, it is preferable to reversely rotate the roller against the operation direction to ameliorate smoothing performance.

Furthermore, a stage 15 is lowered according to the number of lamination to keep the gap constant between the head unit 11, the head unit 12, and the UV ray irradiator 13 and the fabrication object 17 and a support 18, In addition, the solid freeform fabrication device 10 may furthermore optionally include a mechanism for collecting and recycling the forming materials. Also, the solid freeform fabrication device 10 optionally includes a blade to remove the forming material attached to the nozzle surface and a detection mechanism to detect non-discharging nozzles. Moreover, it is preferable to control the environment temperature in the device during fabrication.

If the above-mentioned device is used, it is possible to control composition distribution and form control according to the state of a treatment site of a patient so that a blood vessel model or an internal organ model reflecting the form and property distribution peculiar to the patient.

For example, using personal data of a patient, it is possible to provide not only a blood vessel form of a diseased part subject to catheter treatment but also a hardness distribution (composition distribution) of blood vessels, if necessary. Also in this case, the blood vessel is manufactured based on personal data of the patient.

To provide the composition distribution, for example, the amount of solvent contained in a hydrogel can be adjusted. This can be realized using a mechanism of discharging a plurality of compositions from respective inkjet heads utilizing the inkjet method described above.

A hydrogel forming material (hereinafter also referred to as liquid A) is discharged from a first head as a first liquid. A solvent (hereinafter also referred to as liquid B) capable of diluting the hydrogel forming material and mainly composed of water and a solvent soluble in water, is discharged from a second head as a second liquid. Moreover, a support forming material used to form a hollow tube in a blood vessel model is discharged from a third head as a third liquid.

The liquid A and the liquid B are discharged from each inkjet head in a predetermined amount of printing and the ratio of the liquid jetted onto the same site can be precisely controlled.

The method of manufacturing a hydrogel structure of the present disclosure is described below with reference to specific embodiments.

The method of obtaining a hydrogel structure having different hardness, compression stress, and modulus of elasticity is described in detail.

First, surface data or solid data of a three-dimensional form designed by three dimensional computer-aided design (CAD) or taken in by a three-dimensional scanner or a digitizer are converted into Standard Template Library (STL) format, which is thereafter input into a additive manufacturing device.

Next, compression stress distribution of the three dimensional form is measured. There is no specific limitation to methods of measuring the compression stress. For example, compression stress distribution data of a three-dimensional form are obtained by using MR Elastography (MRE), which are thereafter input into the additive manufacturing device. Based on the input compression stress data, the mixing ratio of the liquid A and the liquid B to be discharged to sites corresponding to the data of a three-dimensional form is determined.

Based on the input data, the direction of the fabrication of a three-dimensional form to be fabricated is determined.

The fabrication direction is not particularly limited. Normally, the direction is chosen such that the Z direction (height direction) is the lowest.

After determining the direction of fabrication, the projected areas on X-Y plane, X-Z plane, and Y-Z plane of the three-dimensional form are obtained.

The thus-obtained block form is sliced in the Z direction with a thickness of a single layer. The thickness of a single layer changes depending on the material. For example, it is from 20 to 60 μm. When only one three-dimensional object is manufactured, this block form is disposed in the center of the Z stage (i.e., table on which the object lifted down layer by layer for each layer forming is placed). In addition, when a plurality of three-dimensional objects are fabricated at the same time, the block forms are arranged on the Z stage.

Alternatively, the block forms can be piled up. It is possible to automatically create these block forms, the slice data (contour line data), and the placement on the Z stage if materials to be used are determined.

Figure 5:
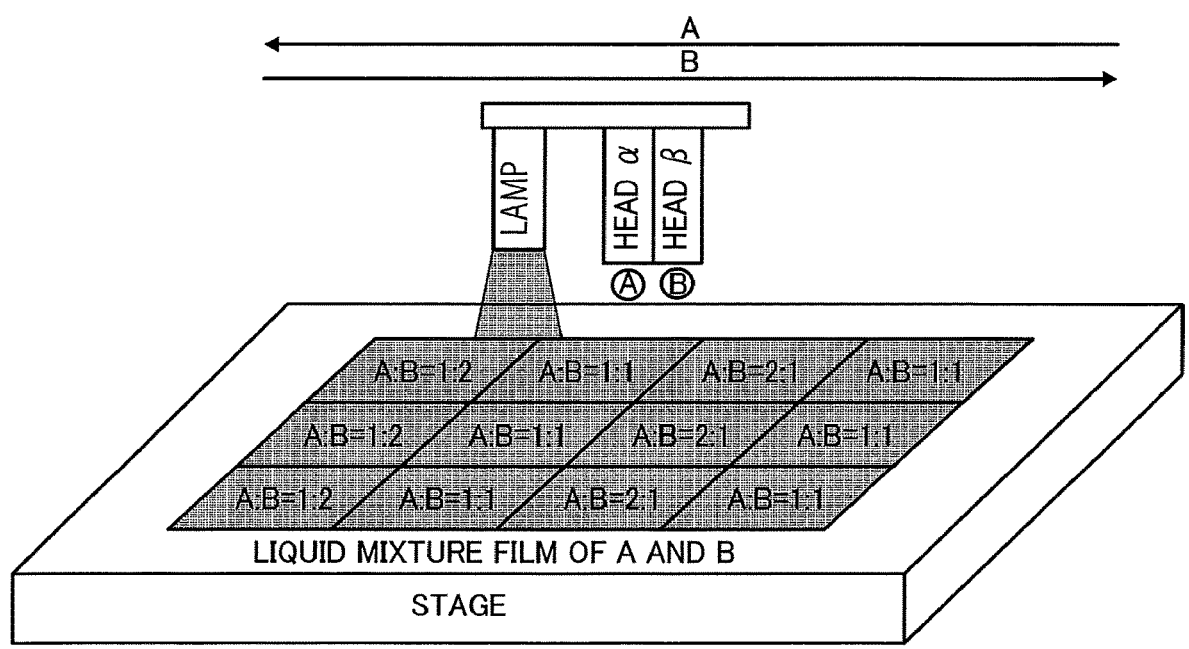
FIG. 5 is a schematic diagram illustrating an example of a solid freeform fabrication device for use in the method (additive manufacturing method) of manufacturing a hydrogel structure according to an embodiment of the present disclosure.
Figure 6:
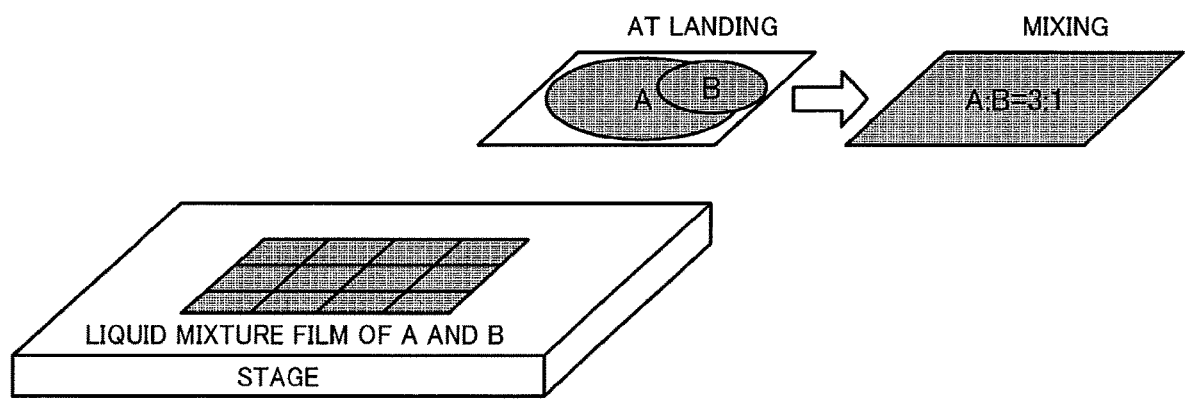
FIG. 6 is a schematic diagram illustrating an example in which a first liquid and a second liquid are mixed according to a liquid discharging method.

Next, fabrication step is conducted. FIG. 5 is a schematic diagram illustrating an example of a solid freeform fabrication device for use in the method of manufacturing the hydrogel structure according to an embodiment of the present disclosure. FIG. 6 is a schematic diagram illustrating an example in which the first liquid and the second liquid are mixed according to a liquid discharging method. Different heads α and β (illustrated in FIG. 5) are moved bi-directionally and discharge the liquid A and the liquid B to a determined area in a determined amount ratio to form a dot. The liquid A and the liquid B can be mixed in the dot as illustrated in FIG. 6 to obtain the pre-determined mixing ratio (liquid "A":liquid "B").

Moreover, such dots are continuously formed to form a liquid mixture film of the liquid A and the liquid B having the pre-determined mass ratio in the pre-determined area. Thereafter, the liquid mixture film is irradiated with ultraviolet (UV) rays and cured to form a hydrogel film (layer) having the pre-determined ratio in the pre-determined area as illustrated in FIG. 5.

After a single layer of the hydrogel film (layer) is formed, the stage (FIG. 5) is lowered in an amount corresponding to the thickness of the single layer. Again, the dots are continuously formed on the hydrogel film to form a liquid mixture film of the liquid A and the liquid B having a pre-determined mass ratio in a pre-determined area. Thereafter, the liquid mixture film of the liquid A and the liquid B is irradiated with ultraviolet (UV) rays and cured to form a hydrogel film. This lamination is repeated to form a three-dimensional object.

The thus-fabricated three-dimensional object (hydrogel object) has different mass ratios of liquid A and liquid B in the solid hydrogel of the liquid film illustrated in FIG. 5 so that modulus of elasticity therein can be continuously changed. If the mixing ratio pattern is adjusted for each cross section layer, a hydrogel structure partially having an arbitrary physical property can be obtained.

Furthermore, the UV ray irradiator is disposed next to an inkjet head to jet a hydrogel forming material to save time to be taken for smoothing treatment, thereby speeding up the fabrication.

The hydrogel structure for use in the present disclosure can be arbitrarily changed in hardness using the same material if the composition ratio thereof is changed by the combination of the hydrogel forming material and diluting fluid. For this reason, in the case of fabrication according to an inkjet method, it is easy to provide a hardness distribution of a blood vessel based on personal data if the ratio of both is changed using a plurality of inkjet heads.

The hydrogel includes a massive amount of water and has a composition extremely close to a human body. Also, the texture thereof is very close as well. If this is used in combination with 3D printing, it is very useful to form a blood vessel model.

Since the hydrogel structure, the blood vessel model, and the internal organ model of the present disclosure can be manufactured by utilizing 3D printing technologies, a model reproducing the form and the property can be manufactured based on the data of the diseased part of a patient. For this reason, it is suitable to use it for a simulation for delicate surgery.

For example, in typical operations (stent inserting into a swollen part), the form of the swollen part is read from an X-ray image and a stent considered having an appropriate form is selected and used during the operation. However, this relies on the experience of a doctor (surgeon). Therefore, in many cases, it took a long time before a decision or the most suitable stent was not selected.

If what form of a tool such as stent is to be selected is checked according to the form or the property of the swollen part before operation, the chance of success of the operation is expected to be high.

In the present disclosure, another embodiment of the blood vessel model or the internal organ model to which the technology of the present disclosure is applied is also disclosed.

The hydrogel structure of the present disclosure includes a hollow tubular structure having an inner diameter of 1.0 mm or less. To manufacture this structure, the hollow tubular structure is formed using the support forming material as described above. It is suitable to use a solid material phase-changeable to liquid by heat as the support forming material. This technology is applicable to this structure.

When a blood vessel model and an internal organ model having the hollow structure are fabricated, fabrication is finished without removing the supporting material with which the inside of the hollow structure is filled. As a result, while the hollow structure is maintained, the blood vessel model and the internal organ model in which the phase-changeable supporting material remains are manufactured. The supporting material used is preferably colored in red like blood by a colorant.

The blood vessel model and the internal organ model are obtained by a second embodiment of the method of manufacturing the hydrogel structure of the present disclosure.

The blood vessel model and the internal organ model can be used in the training for medical procedure using surgical tools such as ultrasonic wave knife and electrosurgical knife. More specifically, in the training of dissecting the site near the blood vessel disposed in an internal organ model, it can be used as an internal organ model from which blood bleeds if the blood vessel is mistakenly damaged.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

The inner diameter of the structure was measured as follows:

Inner Diameter of Structure

The inner diameter of the structure was measured using a one-shot 3D form measuring device (manufactured by KEYENCE CORPORATION).

To obtain the accuracy of the measuring, several samples were measured in advance and the cross sections thereof were cut out and measured with caliper as well to confirm that the measuring results were similar.

In the following Examples, non-destructive measuring was conducted using a one-shot 3D form measuring device.

Preparation Example 1 of Hydrogel Forming Material

Preparation of Hydrogel Forming Material A

While stirring 120.0 parts of deionized water (hereinafter, also referred to as pure water) treated with degassing with a reduced pressure for 30 minutes, 12.0 parts of synthesized hectorite (laponite XLG, manufactured by RockWood) having a composition of $[Mg_{5.34}Li_{0.66}Si_8O_{20}(OH)_4]Na^-_{0.66}$ as laminate clay mineral was added little by little to the pure water followed by stirring. Moreover, 0.6 parts of etidronic acid (manufactured by Tokyo Chemical Industry Co. Ltd.) was added thereto to obtain a liquid dispersion.

Next, 44.0 parts of acryloyl morpholine (manufactured by KJ Chemicals Corporation) from which the polymerization inhibitor was removed by causing it to pass through an active alumina column as the polymerizable monomer and 0.4 parts of methylenebis acrylamide (manufactured by Tokyo Chemical Industry Co. Ltd.) was added to the thus-obtained liquid dispersion.

Moreover, 20.0 parts of glycerin (manufactured by Sakamoto Yakuhin kogyo Co., Ltd.), 0.8 parts of N,N,N',N'-tetramethylethylene diamine (manufactured by Tokyo Chemical Industry Co. Ltd.), 0.6 parts of Surflon S-243 (manufactured by AGC SEIMI CHEMICAL CO LTD.), and 1.2 parts of Irgacure 184 (4 percent by mass methanol solution, manufactured by BASF) were admixed with the resultant to prepare a Hydrogel forming material A (Ink A).

Preparation Examples 2 to 4 of Hydrogel Forming Material

Preparation of Hydrogel Forming Material B to D

Hydrogel forming materials B to D were prepared in the same manner as in Preparation Example 1 except that the composition was changed to those shown in the following Table 1.

Preparation Example 5 of Hydrogel Forming Material

Preparation of Gel Forming Material E

Polyvinyl alcohol having an average polymerization degree of about 2,000 and a saponification degree of 89 mol percent were caused to be dissolved in water containing 0.9 percent by mass NaCl. At this point, to promote dissolution of polyvinyl alcohol, the system was heated to 60 degrees C. After dissolution, the solution was cooled down to prepare a gel forming material E.

TABLE 1

| | | Hydrogel forming material | | | |
| | | A | B | C | D |
|---|---|---|---|---|---|
| Polymerizable Monomer | Acryloylmorpholine | 44.0 | 44.0 | 44.0 | 44.0 |
| | Methylenebis acrylamide | 0.4 | 0.4 | 0.4 | 0.4 |
| Water | Pure water | 120.0 | 120.0 | 120.0 | 120.0 |
| Mineral | Synthesized hectorite | 12.0 | 12.0 | 12.0 | 12.0 |
| Drying Retardant | Glycerin | 20.0 | 20.0 | 20.0 | 20.0 |
| Dispersant | Etidronic acid | 0.6 | 0.6 | 0.6 | 0.6 |
| Polymerization promoter | N,N,N',N'-tetramethylethylene diamine | 0.8 | 0.8 | 0.8 | 0.8 |
| Surfactant | EMULGEN LS106 | — | 0.6 | 0.2 | — |
| | Surflon S-243 | 0.6 | — | — | — |
| Polymerization Initiator | Photopolymerization initiator Irgacure 184 | 1.2 | 1.2 | 1.2 | 1.2 |

In Table 1, the product names and the manufacturing companies of the ingredients are as follows:

Acryloylmorpholine: manufactured by KJ Chemicals Corporation

Methylenebis acrylamide: manufactured by Tokyo Chemical Industry Co. Ltd.

Synthesized hectorite: Laponite XLG, manufactured by RockWood

Glycerin: manufactured by Sakamoto Yakuhin kogyo Co., Ltd.

Etidronic acid: manufactured by Tokyo Chemical Industry Co. Ltd.

N,N,N',N'-tetramethylethylene diamine: manufactured by Tokyo Chemical Industry Co. Ltd.

EMULGEN LS106: manufactured by KAO CORPORATION

Surflon S-243, manufactured by AGC SEIMI CHEMICAL CO., LTD.

Irgacure 184: manufactured by BASF, 4 percent by mass methanol solution

Preparation Example 1 of Support (Core Part) Forming Material

Preparation of Support Forming Material A 58.0 parts of 1 dodecanol (Solvent (C), manufactured by Tokyo Chemical Industry Co. Ltd.), 48.0 parts of stearyl acrylate (polymer (A), manufactured by Tokyo Chemical Industry Co. Ltd.), and 4.0 parts of Irgacure 819 (Polymerization initiator (B), manufactured by BASF) were stirred, mixed, and dissolved to prepare a support forming material A. The compositions are shown in the following Table 2.

Preparation Example 2 of Support (Core Part) Forming Material

Preparation of Support Forming Material C 58.0 parts of 1 dodecanol (Solvent (C), manufactured by Tokyo Chemical Industry Co. Ltd.), 15.0 parts of polypropylene glycol 2000 (Solvent (D), manufactured by Tokyo Chemical Industry Co. Ltd.), 48.0 parts of stearyl acrylate (polymer (A), manufactured by Tokyo Chemical Industry Co. Ltd.), and 4.0 parts of Irgacure 819 (Polymerization initiator (B), manufactured by BASF) were stirred, mixed, and dissolved to prepare a support forming material C. The compositions were shown in the following Table 2.

Preparation Example 3 of Support (Core Part) Forming Material

Preparation of Support Forming Material D 58.0 parts of 1 dodecanol (Solvent (C), manufactured by Tokyo Chemical Industry Co. Ltd.), 30.0 parts of polypropylene glycol 2000 (Solvent (D), manufactured by Tokyo Chemical Industry Co. Ltd.), 48.0 parts of stearyl acrylate (polymer (A), manufactured by Tokyo Chemical Industry Co. Ltd.), and 4.0 parts of Irgacure 819 (Polymerization initiator (B), manufactured by BASF) were stirred, mixed, and dissolved to prepare a support forming material D. The compositions are shown in Table 2.

Preparation Example 4 of Support (Core Part) Forming Material

Preparation of Support Forming Material E 58.0 parts of 1 dodecanol (Solvent (C), manufactured by Tokyo Chemical Industry Co. Ltd.), 20.0 parts of polypropylene glycol 2000 (Solvent (D), manufactured by Tokyo Chemical Industry Co. Ltd.), 28.0 parts of stearyl acrylate (polymer (A), manufactured by Tokyo Chemical Industry Co. Ltd.), and 4.0 parts of Irgacure 819 (Polymerization initiator (B), manufactured by BASF) were stirred, mixed, and dissolved to prepare a support forming material E. The compositions are shown in Table 2.

TABLE 2

| | | Support forming material | | | |
|---|---|---|---|---|---|
| | | A | C | D | E |
| Polymerizable monomer | Stearyl acrylate | 48.0 | 48.0 | 48.0 | 28.0 |
| Organic solvent | 1-dodecanol | 58.0 | 58.0 | 58.0 | 58.0 |
| | Propylene glycol 2000 | — | 15.0 | 30.0 | 20.0 |
| Polymerization Initiator | Photo-polymerization initiator Irgacure 819 | 4.0 | 4.0 | 4.0 | 4.0 |

In Table 2, the product names and the manufacturing companies of the ingredients are as follows:

Stearyl acrylate: manufactured by Tokyo Chemical Industry Co. Ltd.

1-dodecanol: manufactured by Tokyo Chemical Industry Co. Ltd.

Propyleneglycol 2000: manufactured by Tokyo Chemical Industry Co. Ltd.

Irgacure 819: manufactured by BASF

Preparation Example 5 of Support (Core Part) Forming Material

Preparation of Support Forming Material B 3 parts of magenta pigment liquid dispersion was mixed and dispersed with 100 parts of the support forming material A in the following manner to prepare a support forming material B.

Preparation of Magenta Pigment Liquid Dispersion

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 4.0 g of styrene macromer, and 0.4 g of mercapto ethanol were mixed in the flask followed by heating to 65 degrees C. Thereafter, a liquid mixture of 100.8 g of styrene, 25.2 g of acrylic acid, 108.0 g of lauryl methacrylate, 36.0 g of polyethylene glycol methacrylate, 60.0 g of hydroxy-ethyl methacrylate, 36.0 g of styrene macromer, 3.6 g of mercapto ethanol, 2.4 g of azobismethyl valeronitrile, and 18 g of methylethyl ketone was dripped into the flask in two and a half hours. Thereafter, a liquid mixture of 0.8 g of azobismethyl valeronitrile and 18 g of methylethylketone were dripped into the flask in half an hour followed by aging for one hour at 65 degrees C. Moreover, 0.8 g of azobismethyl valeronitrile was added to the resultant. Subsequent to one-hour aging, 364 g of methylethyl ketone was added to the flask to obtain 800 g of a 50 percent by mass polymer solution.

After 28 g of the polymer solution, 42 g of magenta pigment (C.I. Pigment Red 122), 13.6 g of 1 mol/L potassium hydroxide solution, 20 g of methylethyl ketone, and 13.6 g of deionized water were sufficiently stirred, the mixture was mixed and kneaded using a roll mill to obtain a paste. Thereafter, the thus-obtained paste was loaded in 200 g of pure water. Subsequent to sufficient stirring, methylethyl ketone and water were distilled away using an evaporator. Furthermore, filtration under a pressure was conducted with a polyvinylidene fluoride membrane filter having an average hole diameter of 5.0 μm to obtain a liquid dispersion of a magenta pigment having a content of pigment of 15 percent by mass and a solid portion accounting for 20 percent by mass.

Example 1

Using the fabrication device illustrate in FIG. 4, the hydrogel forming material A and the support forming material A (both were active energy ray curable composition) were discharged and cured upon application of ultraviolet rays repeatedly to manufacture an additive manufacturing object. Thereafter, the additive manufacturing object was left still in a constant temperature tank set at 50 degrees C. for 30 minutes to liquefy and remove the pillar-like core part as the cured matter of the support forming material A. Moreover, the residual of the pillar-like core part was rinsed away with 50 degree C. water so that a hydrogel structure (blood vessel model) having a hollow tubular structure as illustrated in FIG. 2 was obtained.

The inner diameter (hollow) of the blood vessel hollow portion in the thus-obtained hydrogel structure was 5 mm at the thick portion and 0.4 mm at the thinnest portion. The hydrogel structure was served for a catheter insertion evaluation by doctors and they confirmed that the catheter was observed from the outside of the blood vessel. In addition, it was confirmed that microcatheter reached the distal end of the blood vessel hollow portion in the hydrogel structure and the hollow tubular structure was reproduced.

After the test, the hydrogel structure was cut at the hydrogel tube portion in the longitudinal direction to obtain a plate-like form. The transmission of the form was measured in the wavelength range of from 400 to 700 nm by a spectrophotometer (UV-3100, using integration unit, manufactured by Shimadzu Corporation). As a consequence, the transmission was 91 percent or more in the wavelength range of from 400 to 700 nm.

Example 2

Another hydrogel structure was obtained in the same manner as in Example 1 except that the hydrogel forming material A was changed to the hydrogel forming material B.

The result of the texture at the time of inserting a catheter was on the same level as that of Example 1. In addition, the transmission was 87 percent or more in the wavelength range of from 400 to 700 nm. The inner diameter (hollow) of the blood vessel hollow portion in the thus-obtained hydrogel structure was 5 mm at the thick portion and 0.3 mm at the thinnest portion.

Example 3

Another hydrogel structure was obtained in the same manner as in Example 1 except that the hydrogel forming material A was changed to the hydrogel forming material C.

When the transmission of the thus-obtained hydrogel structure was measured in the same manner as in Example 1, the transmission was 81 percent or more in the wavelength range of from 400 to 700 nm. In addition, the inner diameter (hollow) of the blood vessel hollow portion in the thus-obtained hydrogel structure was 4 mm at the thick portion and 0.2 mm at the thinnest portion.

Example 4

The hydrogel structure obtained in Example 1 was built-in a glass container as illustrated in FIGS. 3A and 3B. According to the catheter insertion evaluation by doctors, handling property was improved while the texture at the time of insertion of a catheter and the visual confirmation of catheter operation were the same.

Example 5

The hydrogel structure obtained in Example 1 was built-in a polycarbonate resin container.

According to the catheter insertion evaluation by doctors, handling property was improved while the texture at the time of insertion of a catheter and the visual confirmation of catheter operation were the same.

Example 6

Another hydrogel structure was obtained in the same manner as in Example 1 except that the fabrication data used for fabrication was changed to data created from the blood vessel image of a real patient. Thereafter, CT images of the obtained hydrogel structure was taken and compared with the CT image of the blood vessel of the patient.

As a consequence, it was confirmed that the hollow form of the detailed portion was almost completely reproduced within an error of from −2 to +2 percent.

Example 7

An internal organ model (liver model) was obtained in the same manner as in Example 1 except that the outlook of the hydrogel forming the circumference of the hollow structure was changed to a form imitating a liver as illustrated in FIG. 7.

The texture at the time of insertion of a catheter, visual confirmation from outside, and the transmission data were on the same level as those of Example 1. Since the outlook of the internal organ was imitated, reality was found to be improved.

Comparative Example 1

The gel forming material E was injected into a mold enclosing a hollow column having a diameter of 8 mm and a height of 50 mm. Moreover, to proceed gelation, the material was subject to freezing and defreezing nine times. Thereafter, the column was extracted from the thus-obtained polyvinyl alcohol gel to obtain a gel structure having a hollow tubular structure.

When the transmission of the thus-obtained hydrogel structure was measured in the same manner as in Example 1, the transmission was less than 80 percent in the wavelength range of from 400 to 700 nm.

The gel structure was served for the catheter insertion test. However, since the gel structure was not transparent, it was not possible to visually confirm the sensitive behavior of a catheter from outside. In addition, the hollow tube of the thus-obtained gel structure had an inner diameter of 8 mm.

Comparative Example 2

Another hydrogel structure was obtained in the same manner as in Example 1 except that the hydrogel forming material A was changed to the hydrogel forming material D.

When the transmission of the thus-obtained hydrogel structure was measured in the same manner as in Example 1, the transmission was less than 80 percent in the wavelength range of from 400 to 700 nm.

The hydrogel structure was served for the catheter insertion test. However, since the hydrogel structure was not transparent (transmission was less than 80 percent), it was not possible to visually confirm the delicate behavior of a catheter from outside. Also, the catheter did not smoothly move in the hollow portion. In addition, the inner diameter (hollow) of the blood vessel hollow portion in the thus-obtained hydrogel structure was 5 mm at the thick portion and 1.0 mm at the thinnest portion.

Comparative Example 3

A fabrication object was obtained in the same manner as in Example 1 except that the blood vessel portion was formed of SUP 706 (manufactured by Stratasys Ltd.) and the wall of the blood vessel and the main part were formed of TangoBlack (manufactured by Stratasys Ltd.). The thus-obtained fabrication object was dipped in water for 12 hours to remove the support forming material to obtain a structure.

A catheter was inserted into the thus-obtained structure to confirm the texture. The blood vessel was extremely hard and the catheter easily stuck. The texture was totally different from that of a real internal organ. In addition, the inner diameter (hollow) of the hollow tube in the thus-obtained hydrogel structure was 5 mm at the thick portion and 1 mm at the thinnest portion. Moreover, the transmission of the structure was less than 80 percent.

Next, visual confirmation, texture, and storage stability were evaluated. The results are shown in Table 3.

Visual Confirmation

The transmission in the visible spectrum (wave length of from 400 to 700 nm) was measured using a spectrophotometer (UV-3100, using integration unit, manufactured by Shimadzu Corporation). Visual confirmation was evaluated according to the following evaluation criteria. When the transmission of a hydrogel structure is high, the hydrogel structure has excellent transparency.

Evaluation Criteria

A: Lowest transmission in the wavelength range of from 400 to 700 nm was 90 percent or more B: Lowest transmission in the wavelength range of from 400 to 700 nm was from 80 to less than 90 percent C: Lowest transmission in the wavelength range of from 400 to 700 nm was less than 80 percent.

Texture

The obtained structure was served for catheter insertion evaluation by doctors. The texture of the catheter (Echelon10, manufactured by Medtronic Public Limited Company) was evaluated according to the following evaluation criteria.

Evaluation Criteria

A: Texture very close to that of real blood vessel

B: Texture far from that of real blood vessel

Storage Stability

Using the hydrogel structures manufactured in Examples 1, 4, and 5, those were left still in atmosphere (25 degrees C., 55 percent RH) for three days. Storage stability was evaluated according to the following evaluation criteria.

Evaluation Criteria

A: No change from initial state

B: Surface slightly dried and hardened

TABLE 3

|  |  | Hydrogel forming material | Support forming material | The maximum inner diameter at thinnest portion (mm) | Rigid object | Form of Hydrogel Structure |
|---|---|---|---|---|---|---|
| Example | 1 | A | A | 0.4 | None | Cuboid |
|  | 2 | B | A | 0.3 | None | Cuboid |
|  | 3 | C | A | 0.2 | None | Cuboid |
|  | 4 | A | A | 0.4 | Glass container | Cuboid |
|  | 5 | A | A | 0.4 | Polycarbonate resin container | Cuboid |
|  | 6 | A | A | 0.4 | None | Cuboid |
|  | 7 | A | A | 0.4 | None | Liver |
| Comparative Example | 1 | E | — | 8.0 | None | Cuboid |
|  | 2 | D | A | 1.0 | None | Cuboid |
|  | 3 | TangoBlack | SUP706 | 1.0 | None | Cuboid |

| | | Evaluation Results | | | |
|---|---|---|---|---|---|
|  |  | Transparency (%) | Visual confirmation | Texture | Storage property |
| Example | 1 | 91 | A | A | C |
|  | 2 | 87 | B | A | — |
|  | 3 | 81 | B | A | — |
|  | 4 | 91 | A | A | A |
|  | 5 | 91 | A | A | A |
|  | 6 | 91 | A | A | — |
|  | 7 | 91 | A | A | — |
| Comparative Example | 1 | <80 | C | C | — |
|  | 2 | <80 | C | C | — |
|  | 3 | <80 | C | C | — |

Example 8

A hydrogel structure (blood vessel model) was manufactured in the same manner as in Example 1 except that the support forming material B was used instead of the support forming material A. The circumference of the thus-manufactured additive manufacturing object was wiped off and cleaned with a cotton soaked in ethanol at room temperature (25 degrees C.) in order for the support forming material B enclosed in the hollow structure portion not to elute off so that fabrication was complete.

The thus-manufactured additive manufacturing object was subject to a test using an electrosurgical knife (general electrosurgical tool, blog DS3-M, manufactured by J. MORITA TOKYO MFG. CORP). When the blood vessel portion was dissected, the support forming material B was melted and eluted off as artificial blood.

Example 9

Another hydrogel structure (blood vessel model) having a hollow tubular structure was obtained in the same manner as in Example 5 except that the support forming material A was changed to the support forming material C.

The thus-obtained hydrogel structure was evaluated in the same manner as in Example 1 with regard to the inner diameter of the structure, the result of insertion of a catheter, and transmission. The inner diameter of the structure, the result of insertion of a catheter, and the result of transmission were the same as those of Example 5.

Example 10

Another hydrogel structure (blood vessel model) having a hollow tubular structure was obtained in the same manner as in Example 5 except that the support forming material A was changed to the support forming material D.

The thus-obtained hydrogel structure was evaluated in the same manner as in Example 1 with regard to the inner diameter of the structure, the result of insertion of a catheter, and transmission. The inner diameter of the structure, the result of insertion of a catheter, and the result of transmission were the same as those of Example 5.

Example 11 Another hydrogel structure (blood vessel model) having a hollow tubular structure was obtained in the same manner as in Example 5 except that the support forming material A was changed to the support forming material E.

The thus-obtained hydrogel structure was evaluated in the same manner as in Example 1 with regard to the inner diameter of the structure, the result of insertion of a catheter, and transmission. The inner diameter of the structure, the result of insertion of a catheter, and the result of transmission were the same as those of Example 5.

Next, warp of the support was evaluated in the following manner. The results are shown in Table 4.

Warp of Support

When a half of the fabrication was complete during fabrication of a hydrogel structure, the fabrication device was halted. The hydrogel and the support were observed to evaluate warp of the support according to the following evaluation criteria. The hydrogel structure of Example 5 was evaluated about warp of the support in the same manner as in Examples 9 to 11. It is not possible to continue fabrication when rated as C.

Evaluation Criteria

A: hydrogel and support are united

B: Slight warp observed around circumference of support

C: Support significantly warped and interfere with inkjet head

TABLE 4

|  | Hydrogel forming material | Support forming material | Evaluation Results Warp of support |
|---|---|---|---|
| Example 5 | A | A | B |
| 9 | A | C | A |
| 10 | A | D | A |
| 11 | A | E | A |

When the fabrication object fabricated at an evaluation rate of B was checked in Example 5, fabrication of the distal end and the upper part of the hollow tube was not correctly manufactured.

In Examples 9 to 11, a solvent (D) in which the monomer (A) was poorly dissolved was added to the support forming material, the warp of the support to be fabricated was relieved so that a precise fabricated object was manufactured.

Preparation Example 6 of Hydrogel Forming Material

Preparation of First Liquid A1

While stirring 51.0 parts of deionized water (hereinafter, also referred to as pure water) treated with degassing with a reduced pressure for 30 minutes, 5.5 parts of synthesized hectorite (laponite XLG, manufactured by RockWood) having a composition of $[Mg_{5.34}Li_{0.66}Si_8O_{20}(OH)_4]Na^-_{0.66}$ as laminate clay mineral was added little by little to the pure water followed by stirring. Moreover, 0.3 parts of etidronic acid (manufactured by Tokyo Chemical Industry Co. Ltd.) was added thereto and stirred at 40 degrees C. for two hours to obtain a liquid dispersion.

Next, as the polymerizable monomer, 16.8 parts of acryloyl morpholine (manufactured by KJ Chemicals Corporation) from which the polymerization inhibitor was removed by causing it to pass through an active alumina column, 0.2 parts of methylenebis acrylamide (manufactured by Tokyo Chemical Industry Co. Ltd.), and 3.0 parts of N-dimethyl-acrtlamide were added to the thus-obtained liquid dispersion.

Furthermore, 22.0 parts of glycerin (manufactured by Sakamoto Yakuhin kogyo Co., Ltd.) and 0.3 percent of EMULGEN LS106 (manufactured by Kao Corporation) were added thereto. Thereafter, after the vessel was shielded from light, 0.5 parts of Irgacure 1173 (manufactured by BYK) and 0.4 parts of N,N,N',N'-tetramethylethylene diamine (manufactured by Tokyo Chemical Industry Co. Ltd.) were added thereto. The resultant was stirred and mixed for 30 minutes. Next, subsequent to degassing under a reduced pressure for 10 minutes, the resultant was subject to filtration by a syringe filter (manufactured by ADVANTEC CO., LTD.) having an average opening diameter of 0.8 μm to obtain a uniform first liquid A1.

Preparation Example 1 of Diluting Material

Preparation of Second Liquid B1

Second liquid B1 was prepared in the same manner as in Preparation Example 6 of the hydrogel forming material except that the composition was changed to those shown in the following Table 5.

TABLE 5

|  |  | First liquid A1 | Second liquid B1 |
|---|---|---|---|
| Polymerizable monomer | Acryloylmorpholine | 16.8 | — |
|  | Methylenebis acrylamide | 0.2 | — |
|  | N,N-dimethyl acrylamide | 3.0 | — |
| Water | Pure water | 51.0 | 89.2 |
| Mineral | Synthesized hectorite | 5.5 | — |
| Drying Retardant | Glycerin | 22.0 | 10.2 |
| Dispersing agent | Etidronic acid | 0.3 | 0.3 |
| Polymerization promoter | N,N,N',N'-tetramethylethylene diamine | 0.4 | — |
| Surfactant | EMULGEN LS106 | 0.3 | 0.3 |
| Polymerization Initiator | Photopolymerization initiator Irgacure 1173 | 0.5 | — |

In Table 5, the product names and the manufacturing companies of the ingredients are as follows:

Acryloylmorpholine: manufactured by KJ Chemicals Corporation

Methylenebis acrylamide: manufactured by Tokyo Chemical Industry Co. Ltd.

N,N-dimethylacrylamide: mono-functional monomer, manufactured by KJ Chemicals Corporation Synthesized hectorite: Laponite XLG, available form RockWood Glycerin: manufactured by Sakamoto Yakuhin kogyo Co., Ltd.

Etidronic acid: manufactured by Tokyo Chemical Industry Co. Ltd.

—N,N,N',N'-tetramethylethylene diamine: manufactured by Tokyo Chemical Industry Co. Ltd.

EMULGEN LS106: manufactured by KAO CORPORATION

Irgacure 1173: manufactured by BYK Preparation Example 6 of Support (Core Part) Forming Material Preparation of Support Forming Material 1

55.0 parts of 1 dodecanol (manufactured by Tokyo Chemical Industry Co. Ltd.), 42.0 parts of stearyl acrylate (manufactured by Tokyo Chemical Industry Co. Ltd.), and 3.0 parts of Irgacure 819 (manufactured by BASF) were dissolved by mixing and stirring for 30 minutes to prepare a support forming material 1 while being set at 40 degrees C. The compositions are shown in Table 6.

TABLE 6

|  |  | Support forming material 1 |
|---|---|---|
| Polymerizable monomer | Stearyl alcohol | 42.0 |
| Organic Solvent | 1-dodecanol | 55.0 |
| Polymerization Initiator | Iragucre 819 | 3.0 |

In Table 6, the product names and the manufacturing companies of the ingredients are as follows:

Stearyl acrylate: manufactured by Tokyo Chemical Industry Co. Ltd.

1-dodecanol: manufactured by Tokyo Chemical Industry Co. Ltd.

Irgacure 819: manufactured by BASF

Reference Examples 1 and 2

The first liquid A1 and the second liquid B1 were mixed at a volume ratio shown in Table 7 and the mixture was injected into a mold having a dimension of 30 mm×30 mm×8 mm and cured by an ultraviolet ray irradiator (SPOT CURE SP5-250 DB, manufactured by USHIO INC.). The cured matter was left still at 27 degrees C. for 12 hours to obtain a hydrogel sample for a compression test of Reference Examples 1 and 2. The moisture content and modulus of elasticity of the thus-obtained hydrogel sample were measured. The results are shown in Table 7.

Moisture Content

The moisture content was measured using a heating drying process moisture analyzer (MS-70, manufactured by A&D Company, Limited).

Modulus of Elasticity

To obtain modulus of elasticity, a sample fabricated to have a dimension of 30 mm×30 mm×8 mm was set in a universal tester (AG-1, manufactured by SHIMADZU CORPORATION) with a load cell of 1 kN and a compression jig for 1 kN. The stress to the compression applied to the load cell was recorded by a computer to plot the stress to the amount of displacement. The modulus of elasticity indicates a gradient of the compression stress under 20 percent compression.

TABLE 7

|  |  | First liquid A1 | Second liquid B1 | Moisture Content (%) | Modulus of elasticity (MPa) |
|---|---|---|---|---|---|
| Reference Example | 1 | 1.0 | — | 60.0 | 0.21 |
|  | 2 | 0.5 | 0.5 | 75.0 | 0.02 |

Examples 12 to 13

Using the fabrication device illustrated in FIG. 4, the first liquid A1, the second liquid B1, the support forming material 1 (each of which was an active energy ray curable composition) were discharged at a volume ratio shown in Table 8 and cured upon application of ultraviolet rays repeatedly to manufacture an additive manufacturing object. Thereafter, the additive manufacturing object was left still in a constant temperature tank set at 50 degrees C. for 30 minutes to liquefy and remove the pillar-like core part as the cured matter of the support forming material 1. Moreover, the residual of the pillar-like core part was rinsed away with 50 degree C. water so that a hydrogel structure (blood vessel model) having a hollow tubular structure as illustrated in FIG. 1 was obtained. In the thus-obtained hydrogel structure, the wall of the blood vessel was hard in comparison with surrounding hydrogel thereof.

A catheter was inserted to confirm the texture. As a consequence, it was very close to that of a real blood vessel. The moisture content and the modulus of elasticity were on the same level as those of Reference 1.

Comparative Examples 4 to 5

Another hydrogel structure was obtained in the same manner as in Example 12 except that the volume ratio was changed as shown in the following Table 8. A catheter was inserted into the thus-obtained hydrogel structure to confirm the texture. It was different from that of a real internal organ. The modulus of elasticity was measured in the same manner as described in Reference Example 1. The measuring results were 0.21 MPa at the wall of the blood vessel and 0.21 MPa at the other hydrogel portion in Comparative Example 4 and 0.02 MPa at the wall of the blood vessel and 0.02 MPa at the other hydrogel portion in Comparative Example 5.

Comparative Example 6

A fabrication object was obtained in the same manner as in Example 12 except that the support (pillar-like core part) was formed of SUP 706 (manufactured by Stratasys Ltd.) and the wall of the blood vessel and the main part were formed of TangoBlack (manufactured by Stratasys Ltd.). The thus-obtained fabrication object was dipped in water for 12 hours to remove the support forming material to obtain a structure.

A catheter was inserted into the thus-obtained structure to confirm the texture. The blood vessel was extremely hard and the catheter easily stuck. The texture was totally different from that of a real internal organ. The modulus of elasticity was measured in the same manner as described in Reference Example 1. The measuring results were 2.0 MPa for both of the wall of the blood vessel and the other hydrogel portion Texture was evaluated in the following manner. The results are shown in Table 8.

Texture

The obtained hydrogel structure was served for catheter insertion evaluation by doctors. The texture of the catheter (Echelon10, manufactured by Medtronic Public Limited Company) was evaluated according to the following evaluation criteria.

Evaluation Criteria

A: Texture very close to that of real blood vessel and suitable for practice of insertion of catheter B: Texture not close to that of real blood vessel but usable for practice of insertion of catheter C: Texture not even close to that of real blood vessel and unsuitable for practice of insertion of catheter

TABLE 8

|  |  | Wall of blood vessel | | | | Other hydrogel | | | The maximum inner diameter at thinnest portion (mm) | Transparency (%) | Average thickness of wall of blood vessel (mm) | Evaluation Results Texture |
|---|---|---|---|---|---|---|---|---|---|---|---|---|
|  |  | Support Support forming material | First liquid A1 | Second liquid B1 | Modulus of elasticity (MPa) | First liquid A1 | Second liquid B1 | Modulus of elasticity (MPa) | | | | |
| Example | 12 | 1 | 1.0 | — | 0.21 | 0.5 | 0.5 | 0.02 | 0.2 | 90 | 0.02 | A |
|  | 13 | 1 | 1.0 | — | 0.21 | 0.5 | 0.5 | 0.02 | 0.2 | 90 | 0.06 | A |

TABLE 8-continued

| | | | | | | | | | | | |
|---|---|---|---|---|---|---|---|---|---|---|---|
| Comparative | 4 | 1 | 1.0 | — | 0.21 | 1.0 | — | 0.21 | 0.2 | 90 | 0.02 | B |
| Example | 5 | 1 | 0.5 | 0.5 | 0.02 | 0.5 | 0.5 | 0.02 | 0.2 | 90 | 0.02 | B |
| | | 6 | SUP706 | TangoBlack | 2.0 | TangoBlack | | 2.0 | 0.2 | 0.0 | 0.02 | C |

Example 14

The hydrogel structure obtained in the same manner as in Example 12 was built-in a glass container. While the texture obtained at the time of insertion of a catheter was the same, handling property was improved.

Example 15

The hydrogel structure obtained in Example 12 was built-in a polycarbonate resin container. While the texture obtained at the time of insertion of a catheter was the same, handling property was improved.

Next, storage stability were evaluated in the following manner.

Storage Stability

Using the hydrogel structures manufactured in Examples 12, 14, and 15, those were left still in atmosphere (25 degrees C., 55 percent RH) for three days.

As a consequence, while the surface of the hydrogel structure of Example 12 was slightly dried and hardened, the hydrogel structures of Examples 14 and 15 were not changed at all.

Preparation Example 7 of Hydrogel Forming Material

Preparation of First Liquid A2

Deionized water degassed under a reduced pressure for 30 minutes was defined as pure water.

While stirring 60.0 parts of pure water, 6.0 parts of synthesized hectorite (laponite XLG, manufactured by RockWood) having a composition of $[Mg_{5.34}Li_{0.66}Si_8O_{20}(OH)_4]Na^-_{0.66}$ as laminate mineral was little by little added to the pure water by stirring to prepare a liquid dispersion. Next, 0.3 parts of etidronic acid was added as the dispersant for the synthesized hectorite.

Next, 22.0 parts of acryloyl morpholine (manufactured by KJ Chemicals Corporation) from which the polymerization inhibitor was removed by causing it to pass through an active alumina column as the polymerizable monomer, 0.2 parts of methylenebis acrylamide (organic cross-linking agent, manufactured by Tokyo Chemical Industry Co. Ltd.), 10.2 parts of glycerin as drying retardant, and 0.3 parts of EMULGEN LS106 (manufactured by Kao Corporation) were admixed with the thus-obtained liquid dispersion.

Next, after 0.4 parts of a photopolymerization promotor tetramethylethylene diamine was added and thereafter 0.6 parts of photopolymerization initiator (Irgacure 184, manufactured by BASF) were admixed and stirred.

Subsequent to the stirring and mixing, the resultant was degassed under a reduced pressure for ten minutes. Subsequently, impurities were removed by filtration to obtain a uniform first liquid A2. The compositions are shown in Table 9.

Preparation Example 2 of Diluting Material

Preparation of Second Liquid B2

Second liquid B2 was prepared in the same manner as in Preparation Example 7 of the hydrogel forming material except that the composition was changed to those shown in the following Table 9.

TABLE 9

| | | First liquid A2 | Second liquid B2 |
|---|---|---|---|
| Polymerizable monomer | Acryloylmorpholine | 22.0 | — |
| | Methylenebis acrylamide | 0.2 | — |
| Water | Pure water | 60.0 | 89.2 |
| Mineral | Synthesized hectorite | 6.0 | — |
| Drying retardant | Glycerin | 10.2 | 10.2 |
| Dispersant | Etidronic acid | 0.3 | 0.3 |
| Polymerization promoter | N,N,N',N'-tetramethylethylene diamine | 0.4 | — |
| Surfactant | EMULGEN LS106 | 0.3 | 0.3 |
| Polymerization Initiator | Photopolymerization initiator Irgacure 184 | 0.6 | 0.6 |

In Table 9, the product names and the manufacturing companies of the ingredients are as follows:

Acryloylmorpholine: manufactured by KJ Chemicals Corporation

Methylenebis acrylamide: manufactured by Tokyo Chemical Industry Co. Ltd.

Synthesized hectorite: Laponite XLG, manufactured by RockWood

Glycerin: manufactured by Sakamoto Yakuhin kogyo Co., Ltd.

Etidronic acid: manufactured by Tokyo Chemical Industry Co. Ltd.

N,N,N',N'-tetramethylethylene diamine: manufactured by Tokyo Chemical Industry Co. Ltd.

EMULGEN LS106: manufactured by KAO CORPORATION

Irgacure 184: manufactured by BASF

Reference Examples 3 and 5

The first liquid A2 and the second liquid B2 were mixed as the hydrogel forming material at a volume ratio shown in Table 10 and the mixture was injected into a mold having a dimension of 30 mm×30 mm×8 mm and cured by an ultraviolet ray irradiator (SPOT CURE SP5-250 DB, manufactured by USHIO INC.). The cured matter was left still at 27 degrees C. for 12 hours to obtain hydrogel samples for a compression test of Reference Examples 3 to 5. The moisture content and modulus of elasticity of the thus-obtained hydrogel sample were measured. The results are shown in Table 10.

TABLE 10

|  | | First liquid A2 | Second liquid B2 | Moisture Content (%) | Modulus of elasticity (MPa) |
|---|---|---|---|---|---|
| Reference Example | 3 | 1.0 | — | 60.0 | 0.21 |
|  | 4 | 0.6 | 0.4 | 71.7 | 0.13 |
|  | 5 | 0.5 | 0.5 | 74.6 | 0.02 |

As seen in the results shown in Table 10, it was found to be possible to set a predetermined strength (compression stress and modulus of elasticity) and moisture content if the volume ratio of the first liquid and the second liquid was adjusted in Reference Examples 3 to 5.

Preparation Example 7 of Support (Core Part) Forming Material

Preparation of Support Forming Material 2

50.0 parts of 1 dodecanol (manufactured by Tokyo Chemical Industry Co. Ltd.), 46.0 parts of acryloylmorpholine (manufactured by KJ Chemicals Corporation), and 4.0 parts of Irgacure 819 (manufactured by BASF) were stirred, mixed, and dissolved to prepare a support forming material 2. The compositions are shown in Table 11.

TABLE 11

|  |  | Support forming material 2 |
|---|---|---|
| Polymerizable monomer | Acryloylmorpholine | 46.0 |
| Organic solvent | 1-dodecanol | 50.0 |
| Polymerization initiator | Photopolymerization initiator Irgacure 184 | 4.0 |

Example 16

Using the fabrication device illustrated in FIG. 4, the first liquid A2, the second liquid B2, the support forming material 2 (each of which was an active energy ray curable composition) were discharged at a volume ratio shown in Table 12 and cured upon application of ultraviolet rays repeatedly to manufacture an additive manufacturing object. Thereafter, the additive manufacturing object was left still in a constant temperature tank set at 50 degrees C. for 30 minutes to liquefy and remove the pillar-like core part as the cured matter of the support forming material 2. Moreover, the residual of the pillar-like core part was rinsed away with 50 degree C. water so that a hydrogel structure (blood vessel model) having a hollow tubular structure as illustrated in FIG. 2B was obtained. The modulus of elasticity, the maximum inner diameter at the thinnest portion, and transmission were measured in the same manner as described in Example 1. The results are shown in Tables 12 and 13.

Example 17

Another structure having a swollen part as illustrated in FIG. 2B was obtained in the same manner as in Example 16 except that the volume ratio was changed as shown in the following Table 12. The modulus of elasticity, the maximum inner diameter at the thinnest portion, and transmission were measured in the same manner as described in Example 1. The results are shown in Tables 12 and 13.

Comparative Examples 7 to 8

Hydrogel structures of Comparative Examples 7 and 8 were obtained in the same manner as in Example 16 except that the volume ratio was changed as shown in the following Table 12. The modulus of elasticity, the maximum inner diameter at the thinnest portion, and transmission were measured in the same manner as described in Example 1. The results are shown in Tables 12 and 13.

Comparative Example 9

A fabrication object was obtained in the same manner as in Example 16 except that the support (pillar-like core part) was formed of SUP 706 (manufactured by Stratasys Ltd.) and the other hydrogel, the wall of the blood vessel, and the swollen part were formed of TangoBlack (manufactured by Stratasys Ltd.). The thus-obtained fabrication object was dipped in water for 12 hours to remove the support forming material to obtain a structure. The modulus of elasticity was measured in the same manner as described in Reference Example 1. The measuring results were respectively 2.0 MPa.

TABLE 12

|  |  | Support | Blood vessel model | | | | | |
|---|---|---|---|---|---|---|---|---|
|  |  |  | Other hydrogel | | Wall of blood vessel | | Swollen part | |
|  |  | Support forming material | First liquid A2 | Second liquid B2 | First liquid A2 | Second liquid B2 | First liquid A2 | Second liquid B2 |
| Example | 16 | 2 | 0.6 | 0.4 | 1.0 | — | 0.5 | 0.5 |
|  | 17 | 2 | 0.6 | 0.4 | 0.6 | 0.4 | 0.5 | 0.5 |
| Comparative Example | 7 | 2 | 0.6 | 0.4 | 1.0 | — | 1.0 | — |
|  | 8 | 2 | 0.6 | 0.4 | 0.6 | 0.4 | 0.6 | 0.4 |
|  | 9 | SUP706 | | | TangoBlack | | | |

TABLE 12-continued

|  |  | Modulus of elasticity (MPa) | | | Absolute value of change in modulus of elasticity (\|X - Y\|) |
|---|---|---|---|---|---|
|  |  | Other hydrogel | Blood vessel model | | |
|  |  |  | Wall of blood vessel X | Swollen part Y | |
| Example | 16 | 0.13 | 0.21 | 0.02 | 0.19 |
|  | 17 | 0.13 | 0.13 | 0.02 | 0.11 |
| Comparative Example | 7 | 0.13 | 0.21 | 0.21 | 0.00 |
|  | 8 | 0.13 | 0.13 | 0.13 | 0.00 |
|  | 9 | 2.00 | 2.00 | 2.00 | 0.00 |

Texture was evaluated in the same manner as in Example 1. The results are shown in Table 13.

TABLE 13

|  |  | The maximum diameter at thinnest portion (mm) | Transparency (%) | Evaluation Results Texture |
|---|---|---|---|---|
| Example | 16 | 0.2 | 90 | A |
|  | 17 | 0.2 | 90 | A |
| Comparative Example | 7 | 0.2 | 90 | B |
|  | 8 | 0.2 | 90 | B |
|  | 9 | 0.2 | 0 | B |

In Example 16, the texture of the reproduced swollen part was close to that of a real swollen part so that the texture very close to that of a real blood vessel was reproduced.

In Example 17, the wall of the blood vessel was as hard as the surrounding part but the reproduced hardness thereof was close to that of a mouse having a not hard wall of a blood vessel.

In Comparative Examples 7 to 9, the blood vessel was extremely hard and the catheter easily stuck. The texture was totally different from that of a real blood vessel.

As seen in the results, the blood vessel model in Examples formed of the hydrogel structure in which hardness and moisture content were adjusted has a texture very close that of a real blood vessel so that it was found to be suitable for practices for simulation before surgical operation and insertion of blood vessel catheter.

Aspects of the present disclosure are, for example, as follows.

(1). A hydrogel structure includes a hollow tubular structure having an inner diameter of 1.0 mm or less, wherein the hydrogel structure has a transmission of 80 percent or more in a visible light range.

(2). The hydrogel structure according to (1) mentioned above, wherein the inner diameter is 0.3 mm or less.

(3). The hydrogel structure according to (1) or (2) mentioned above, wherein the transmission in the visible light range is 90 percent or more.

(4). The hydrogel structure according to any one of (1) to (3) mentioned above, wherein the hollow tubular structure includes a solid material in a hollow portion and a phase of the solid material is changed to a liquid state due to heat.

(5). The hydrogel structure according to (4) mentioned above, wherein the hollow tube structure includes a coloring material in the hollow portion.

(6). The hydrogel structure according to any one of (1) to (5) mentioned above, wherein (1): the hollow tubular structure includes a first hydrogel object and is at least partially adjacent to a second hydrogel object having a modulus of elasticity different from that of the first hydrogel object or (2): the hollow tubular structure includes at least two hydrogel objects having different modulus of elasticity.

(7). The hydrogel structure according to (6) mentioned above, wherein the moisture content of the first hydrogel structure having a hollow tubular structure is lower than that of the second hydrogel object having a modulus of elasticity different from that of the first hydrogel object.

(8). The hydrogel structure according to (6) or (7) mentioned above, wherein the modulus of elasticity in the first hydrogel structure having a hollow tubular structure is from 0.1 MPa to 0.5 MPa and the second hydrogel object having a modulus of elasticity different from that of the first hydrogel object is 0.005 to 0.1 MPa.

(9). The hydrogel structure according to any one of (1) to (8) mentioned above, wherein, when the modulus of elasticity at a part of the hydrogel structure is defined as X (MPa) and the modulus of elasticity at another part adjacent to the part of the hydrogel structure is defined as Y (MPa), the absolute value ($|X-Y|$) of the change in modulus of elasticity is 0.1 MPa.

(10). The hydrogel structure according to any one of (1) to (9), wherein the hollow tubular structure includes an inner wall at least part of which has an arithmetic surface roughness of 50 μm or less or a coefficient of static friction of 0.1 or less.

(11). A blood vessel model formed of the hydrogel structure of any one of (1) to (10) mentioned above.

(12). An internal organ model is formed of the hydrogel structure of any one of (1) to (11) mentioned above and has a form imitated to have an outlook of an internal organ.

(13). A practice tool for medical procedure includes at least one of the blood vessel model of (11) mentioned above and the internal organ model of (12) mentioned above and at least one of a catheter and an endoscope.

(14). A method of manufacturing a hydrogel structure including a hollow tubular structure includes forming a pillar-like core part with a core part forming material, covering the pillar-like core part with a hydrogel forming material to form a tube-like portion, and removing the pillar-like core part.

(15). The method according to (14) mentioned above, wherein the pillar-like core part and the tube-like portion are formed utilizing an additive manufacturing method.

(16). The method according to (14) or (15) mentioned above, wherein both of the core part forming material and the hydrogel forming material include an active energy ray curable composition.

(17). The method according to any one of (14) to (16) mentioned above, wherein the pillar-like core part is liquefied by heat and removed.

(18). A method of manufacturing a hydrogel structure including a hollow tubular structure, includes forming a pillar-like core part with a core part forming material including an active energy ray curable composition and covering the pillar-like core part with a hydrogel forming material to form a tube-like portion, wherein a cured object of the active energy ray curable composition is liquefied by heat.

(19). An active energy ray curable liquid composition includes a mono-functional ethylenic unsaturated monomer (A) having a straight chain having 14 or carbon atoms, polymerization initiator (B), and a solvent (C) capable of dissolving the mono-functional ethylenic unsaturated monomer (A), wherein a cured object of the active energy ray curable liquid composition is solid at 25 degrees C. and liquid at 60 degrees C.

(20). The active energy ray curable liquid composition according to (19) mentioned above furthermore includes a solvent (D) in which the mono-functional ethylenic unsaturated monomer (A) is poorly dissolved.

(21). A method of manufacturing a solid freeform fabrication object includes manufacturing the solid freeform fabrication object using the active energy ray curable liquid composition of (19) or (20).

(22). A method of manufacturing a solid freeform fabrication object (hydrogel structure) includes laminating layers of the active energy ray curable liquid composition of (19) or (20), wherein a cured object of the active energy ray curable liquid composition is laminated to form a support portion, removing the support portion by heating after the additive manufacturing.

(23). The method according to (21) or (22) further includes conducting additive manufacturing in such a manner that a cured object of the active energy ray curable liquid composition of (19) or (20) forms a support portion and the hydrogel structure of (1) to (10) mentioned above forms the model part.

(24). A device for manufacturing a solid freeform fabrication object includes a container accommodating the active energy ray curable liquid composition of (19) or (20), a discharging device to discharge the active energy ray curable liquid composition, and a curing device to cure the active energy ray curable liquid composition discharged by the discharging device.

According to the present disclosure, an improved hydrogel structure is provided which has excellent transparency and serves as a blood vessel model. It has a hollow tubular structure imparting excellent texture when the model is cut open by a surgical device such as electrosurgical knife.

Having now fully described embodiments of the present disclosure, it will be apparent to one of ordinary skill in the art that many changes and modifications can be made thereto without departing from the spirit and scope of embodiments of the disclosure as set forth herein.

What is claimed is:

1. A hydrogel structure comprising:
a hollow tubular structure having an inner diameter of 1.0 mm or less,
wherein the hydrogel structure has a transmission of 80 percent or more in a visible light range, and wherein one of the following conditions are met:
(i) the hollow tubular structure comprises a first hydrogel object and is at least partially adjacent to a second hydrogel object having a modulus of elasticity different from that of the first hydrogel object, or
(ii) the hollow tubular structure comprises at least two kinds of hydrogel objects having different modulus of elasticity.

2. The hydrogel structure according to claim 1, wherein the inner diameter is 0.3 mm or less.

3. The hydrogel structure according to claim 1, wherein the transmission in the visible light range is 90 percent or more.

4. The hydrogel structure according to claim 1, wherein the hollow tubular structure comprises a solid material in a hollow portion and a phase of the solid material is changed to a liquid state due to heat.

5. The hydrogel structure according to claim 4, wherein the hollow tubular structure further comprises a coloring material in the hollow portion.

6. The hydrogel structure according to claim 1, wherein the hollow tubular structure comprises a first hydrogel object and is at least partially adjacent to a second hydrogel object having a modulus of elasticity different from that of the first hydrogel object.

7. The hydrogel structure according to claim 1, wherein the hollow tubular structure comprises at least two kinds of hydrogel objects having different modulus of elasticity.

8. The hydrogel structure according to claim 1, wherein the hollow tubular structure comprises an inner wall at least part of which has an arithmetic surface roughness of 50 μm or less.

9. The hydrogel structure according to claim 1, wherein the hollow tubular structure comprises an inner wall at least part of which has a coefficient of static friction of 0.1 or less.

10. A blood vessel model comprising:
the hydrogel structure of claim 1.

11. An internal organ model comprising:
the hydrogel structure of claim 1,
wherein the hydrogel structure has an internal organ-like form.

12. A practice tool for medical procedure comprising:
the blood vessel model of claim 10; and
at least one of a catheter and an endoscope.

13. The practice tool for medical procedure according to claim 12, further comprising an internal organ model, which comprises:
the hydrogel structure, wherein the hydrogel structure has an internal organ-like form.

14. A practice tool for medical procedure comprising:
the internal organ model of claim 11; and
at least one of a catheter and an endoscope.

15. A method of manufacturing a hydrogel structure including a hollow tubular structure, comprising:
forming a pillar-like core part with a core part forming material;
covering the pillar-like core part with a hydrogel forming material to form a tube-like portion; and
removing the pillar-like core part,
wherein the hydrogel forming material has a transmission of 80 percent or more in a visible light range, and wherein one of the following conditions are met:
(i) the hollow tubular structure comprises a first hydrogel object and is at least partially adjacent to a second hydrogel object having a modulus of elasticity different from that of the first hydrogel object, or (ii) the hollow tubular structure comprises at least two kinds of hydrogel objects having different modulus of elasticity.

16. The method according to claim 15, wherein the pillar-like core part and the tube-like portion are formed utilizing an additive manufacturing method.

17. The method according to claim 15, wherein both of the core part forming material and the hydrogel forming material comprise an active energy ray curable composition.

18. The method according to claim 15, wherein the pillar-like core part is liquefied by heat and removed.

19. A method of manufacturing a hydrogel structure including a hollow tubular structure, comprising:
    forming a pillar-like core part with a core part forming material including an active energy ray curable composition; and
    covering the pillar-like core part with a hydrogel forming material to form a tube-like portion,
    wherein a cured object of the active energy ray curable composition is liquefied by heat,
    wherein the hydrogel forming material has a transmission of 80 percent or more in a visible light range, and
    wherein one of the following conditions are met:
    (i) the hollow tubular structure comprises a first hydrogel object and is at least partially adjacent to a second hydrogel object having a modulus of elasticity different from that of the first hydrogel object, or
    (ii) the hollow tubular structure comprises at least two kinds of hydrogel objects having different modulus of elasticity.

* * * * *